United States Patent [19]

Hishinuma

[11] Patent Number: 5,051,902
[45] Date of Patent: Sep. 24, 1991

[54] METHOD AND APPARATUS FOR RADIATION IMAGE PROCESSING AND X-RAY IMAGE PROCESSING, INCLUDING SPATIAL FREQUENCY FILTERING TO IMPROVE GRAININESS

[75] Inventor: Kazuhiro Hishinuma, Kanagawa, Japan

[73] Assignee: Fuji Photo Film Co., Ltd., Kanagawa, Japan

[21] Appl. No.: 259,814

[22] Filed: Oct. 19, 1988

[30] Foreign Application Priority Data

| Oct. 20, 1987 | [JP] | Japan | 62-265011 |
| Oct. 20, 1987 | [JP] | Japan | 62-265016 |
| Oct. 20, 1987 | [JP] | Japan | 62-265017 |
| Oct. 20, 1987 | [JP] | Japan | 62-265018 |
| Mar. 19, 1988 | [JP] | Japan | 63-66751 |
| Mar. 19, 1988 | [JP] | Japan | 63-66752 |

[51] Int. Cl.$^5$ .......................................... G06F 15/42
[52] U.S. Cl. .................................. 364/413.13; 382/54; 364/413.23; 358/111
[58] Field of Search ............... 364/413.13, 413.23; 250/327.2; 382/31.50, 54; 358/111, 167

[56] References Cited

U.S. PATENT DOCUMENTS

| 4,356,398 | 10/1982 | Komaki et al. | 364/413.13 |
| 4,590,582 | 5/1986 | Umemura | 364/413.13 |
| 4,845,762 | 7/1989 | Higashi et al. | 364/413.23 |

FOREIGN PATENT DOCUMENTS 56-11395  7/1981  Japan.

Primary Examiner—Gail O. Hayes
Attorney, Agent, or Firm—Sughrue, Mion, Zinn, Macpeak & Seas

[57] ABSTRACT

In a radiation image processing method, unsharp mask signals Sus.k are calculated by averaging original image signals detected within predetermined ranges surrounding each scanning point on an image-recorded stimulable phosphor, and at least a single attenuation coefficient $\beta l$ among attenuation coefficients $\beta k$ corresponding to the unsharp mask signals Sus.k is adjusted to be a constant within the range of $0 < \beta l$ wherein $\beta l \neq 1$. An operation represented by a formula $$S' = Sb1 - \sum_{k=1}^{n} \beta k(Sb2 - Sus \cdot k)$$

where Sb1 and Sb2 each denote the original image signal or an image signal obtained by intermediate processing of the original image signal, and S' denotes an image signal obtained by the operation processing is carried out by use of the attenuation coefficient $\beta l$, whereby spatial frequency components above the spatial frequency component which the unsharp mask signal Sus.l corresponding to the attenuation coefficient $\beta l$ has are attenuated.

36 Claims, 16 Drawing Sheets

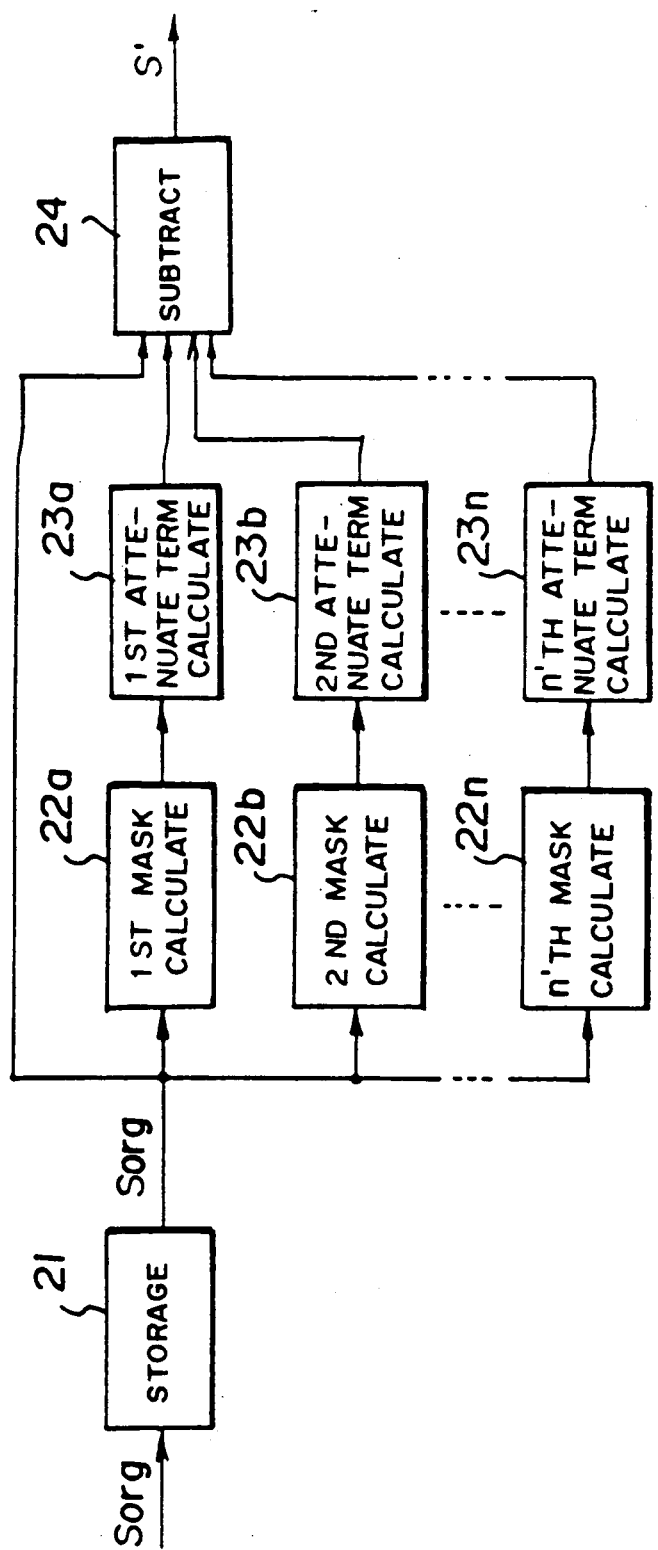

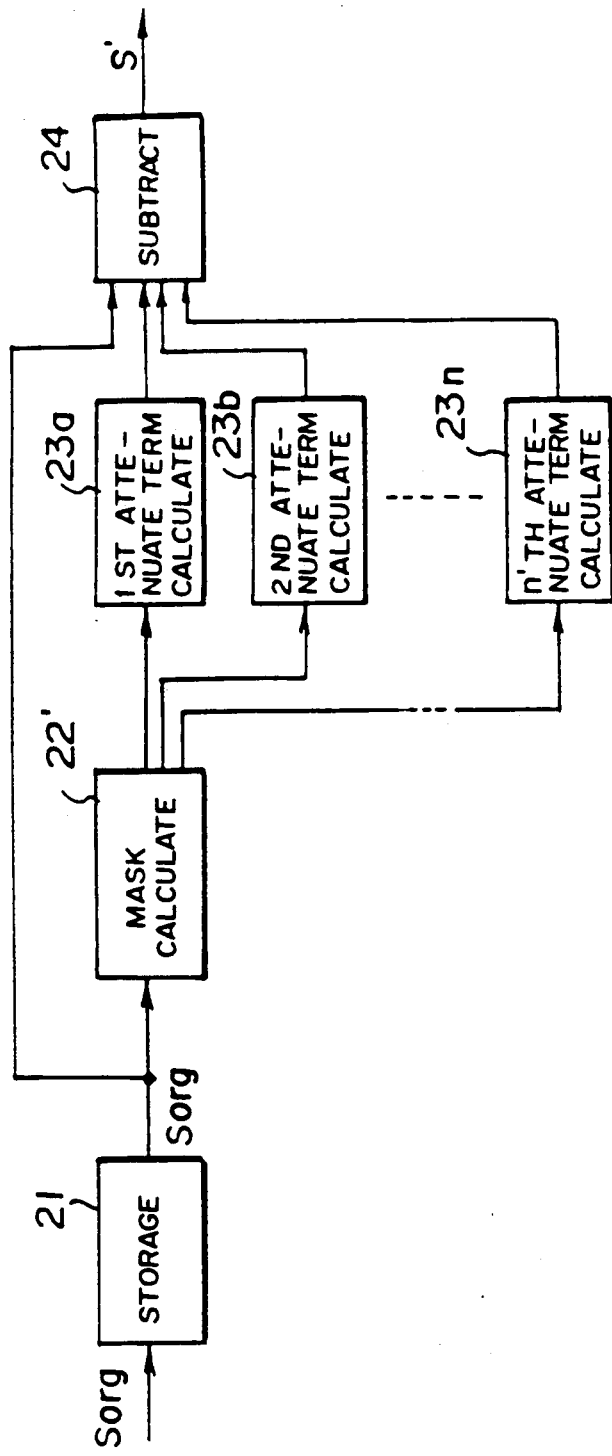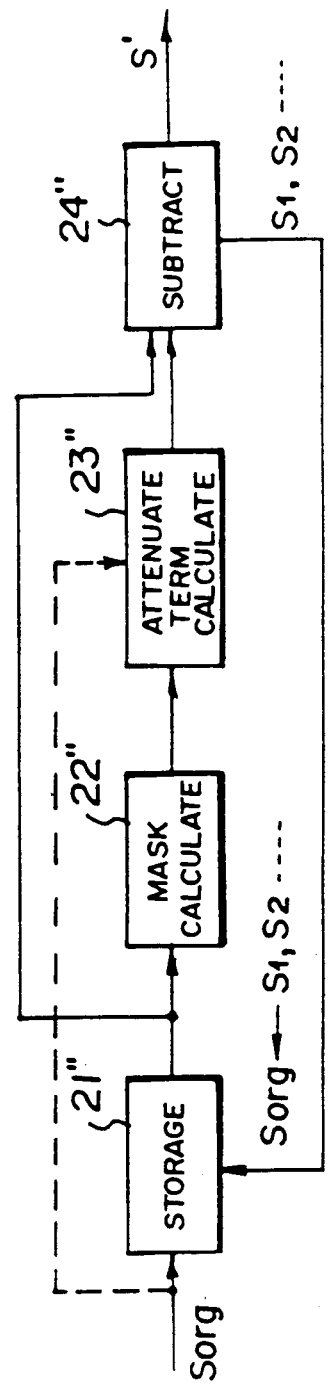
FIG. 3B
FIG. 3C

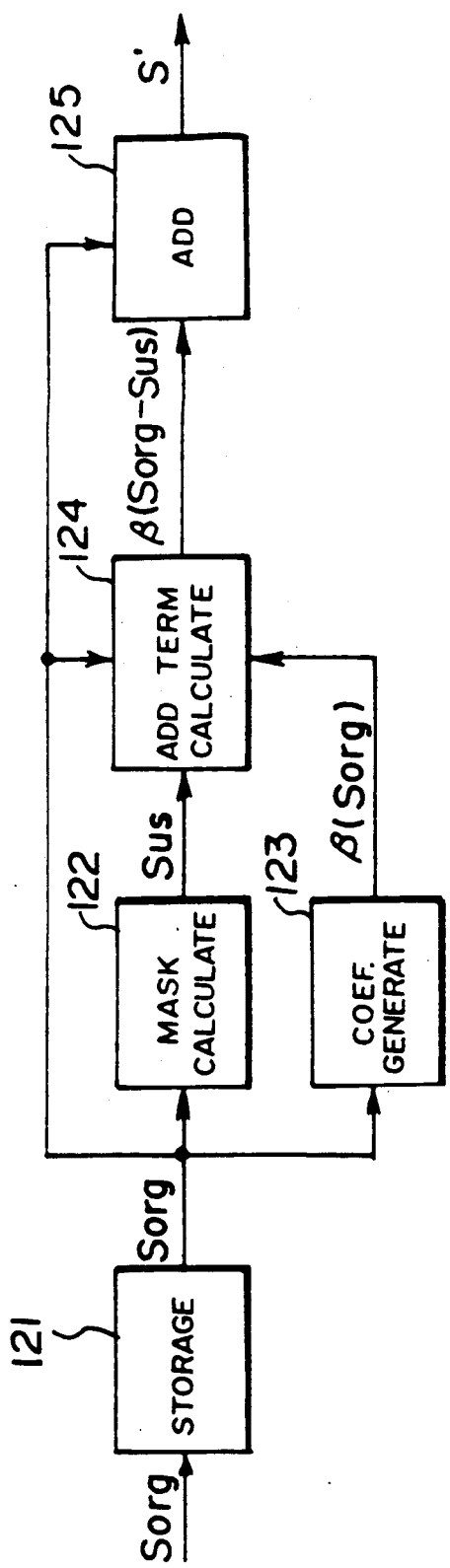

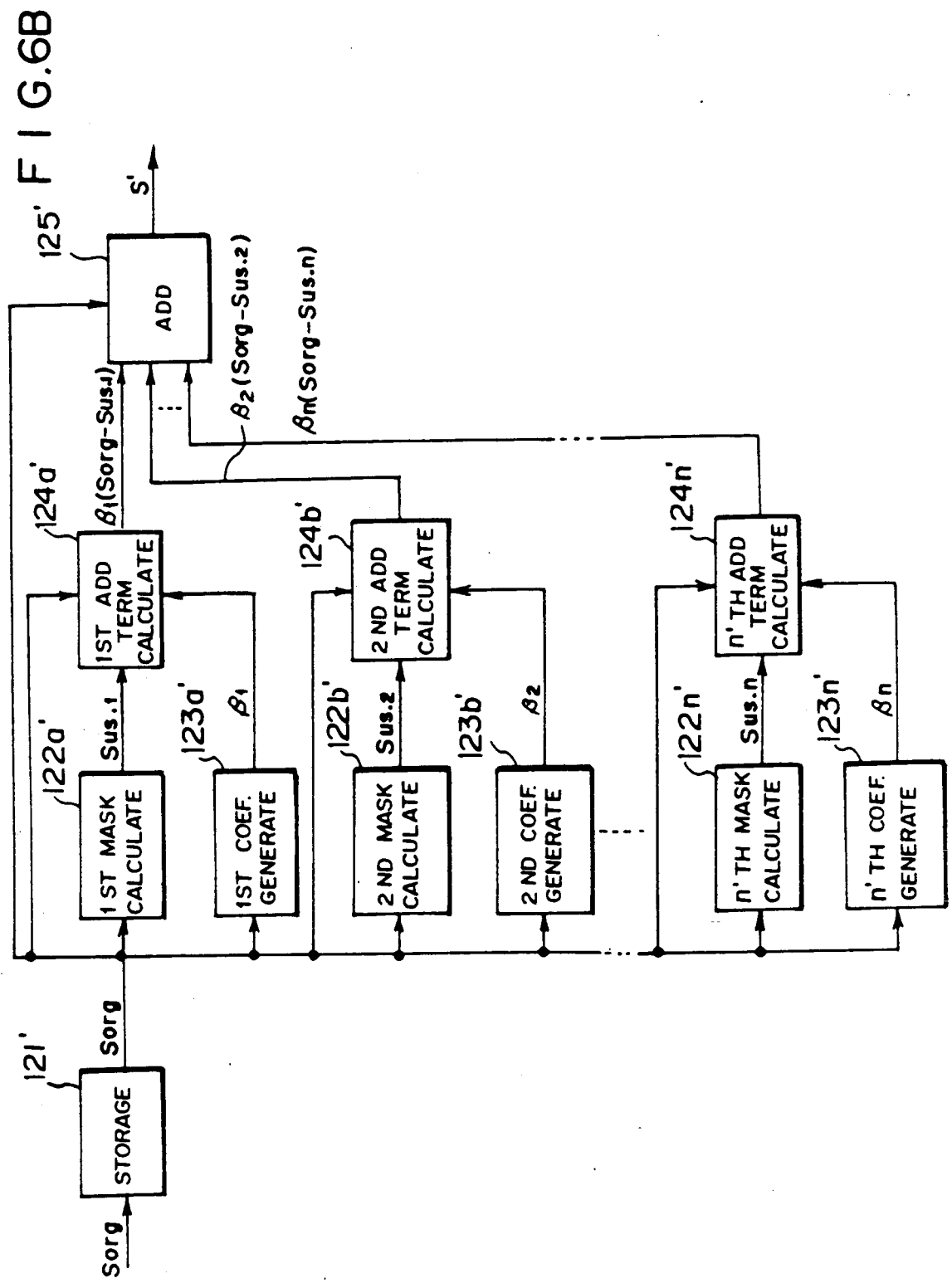

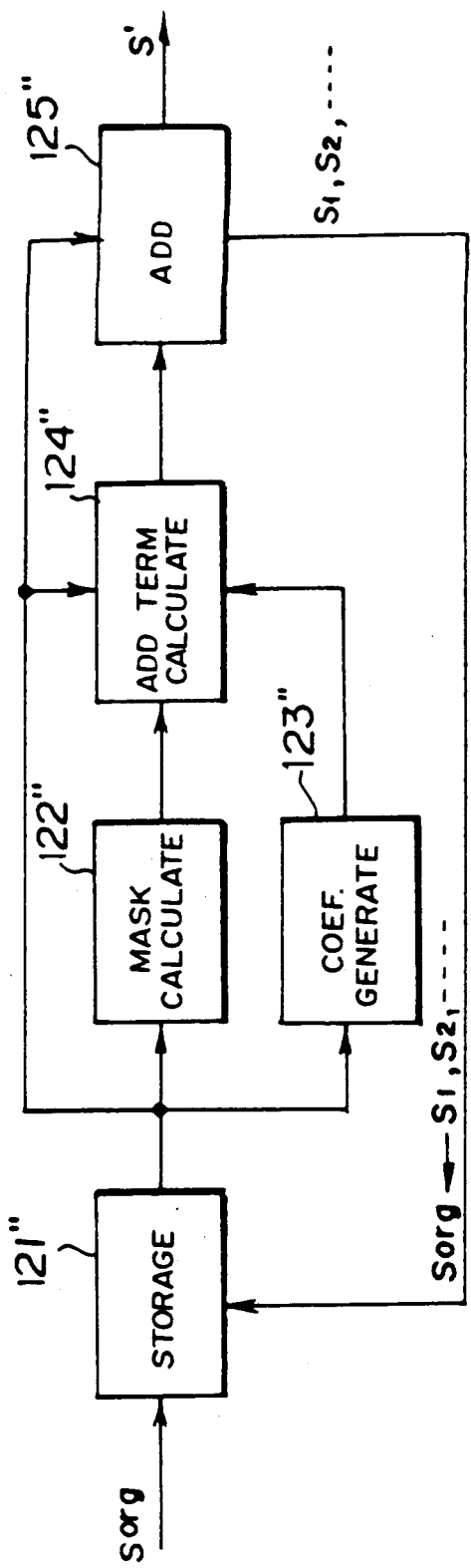

FIG. 8
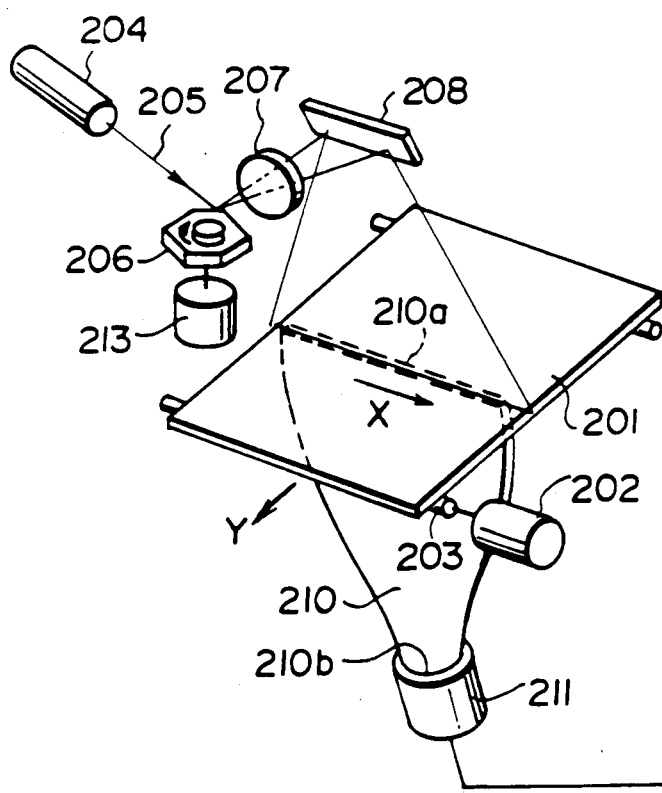
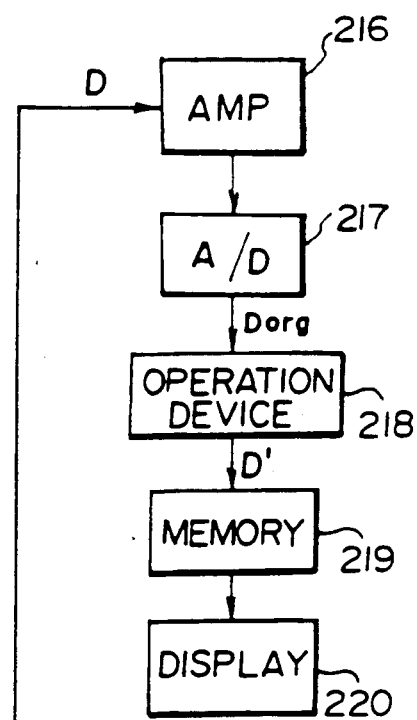

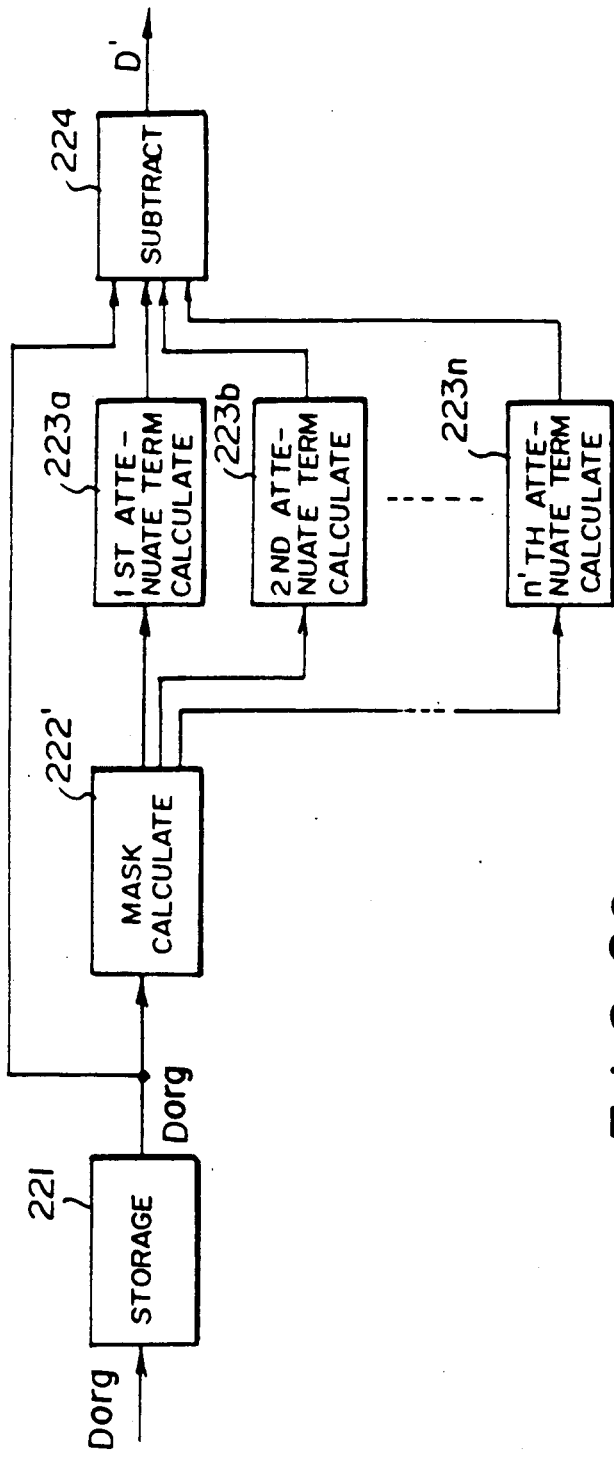
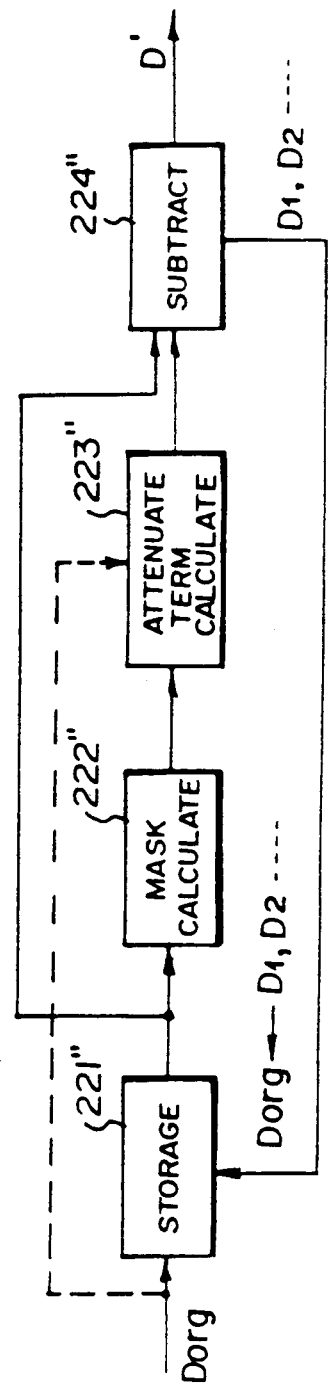
FIG. 9B
FIG. 9C

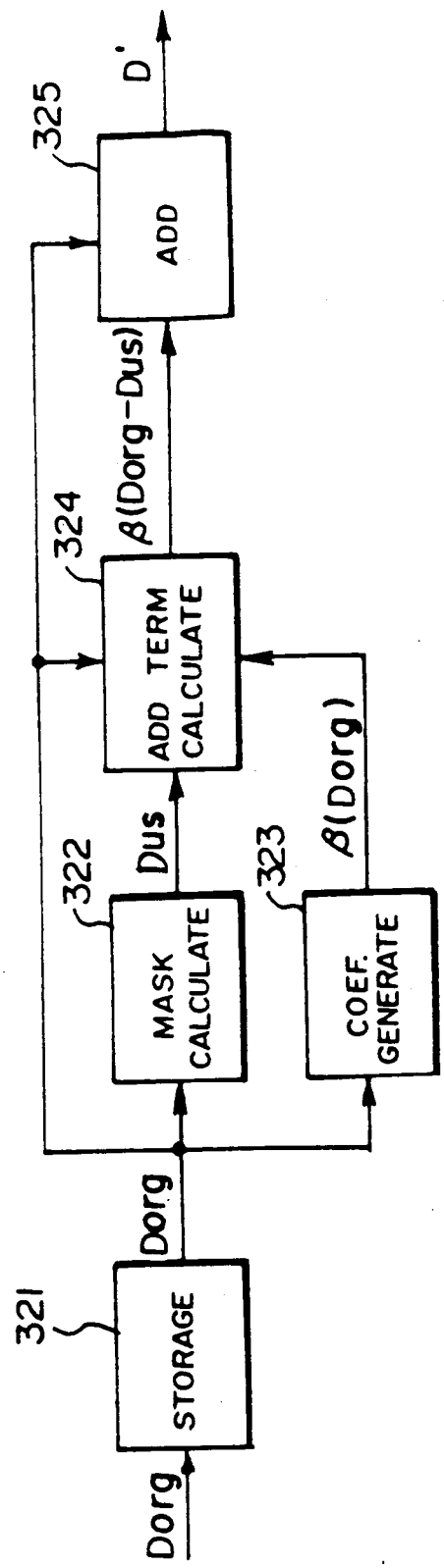
F I G. 12A

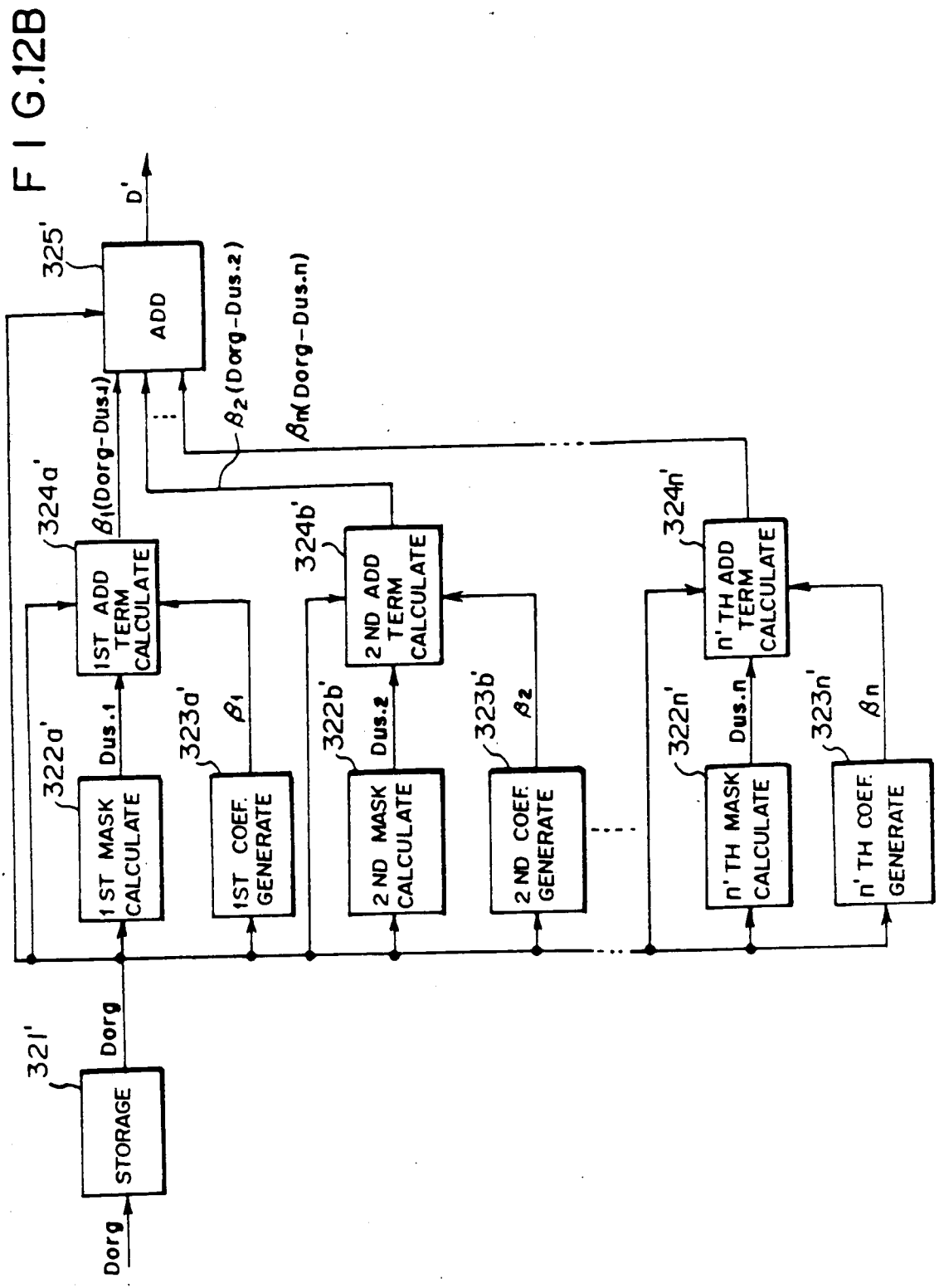

METHOD AND APPARATUS FOR RADIATION IMAGE PROCESSING AND X-RAY IMAGE PROCESSING, INCLUDING SPATIAL FREQUENCY FILTERING TO IMPROVE GRAININESS

BACKGROUND OF THE INVENTION

1. Field of the Invention

This invention relates to frequency response processing for a radiation image, particularly a radiation image processing method in a radiation image recording and reproducing system for recording a radiation image on a stimulable phosphor as an intermediate medium, obtaining image signals from the radiation image, and reproducing the radiation image as a visible image on a recording medium by use of the image signals, and an apparatus for carrying out the method. This invention also relates to an X-ray image processing method for processing the signals representing original image densities detected from an X-ray image, which has been recorded on an original photograph by the irradiation of X-rays to an object, at the time the X-ray image is to be copied, and an apparatus for carrying out the method.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then two-dimensionally scanned by stimulating rays such as a laser beam which cause the stimulable phosphor sheet to emit light in proportion to the stored radiation energy. The light emitted by the stimulable phosphor sheet upon stimulation thereof is photoelectrically detected by a photodetector and converted to electric image signals, and the radiation image of the object is reproduced as a visible image by use of the image signals on a recording medium such as a photographic film, a display device such as a cathode ray tube (CRT), or the like.

The radiation image recording and reproducing system using a stimulable phosphor sheet is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor varies over a wide range in proportion to the amount of said stored energy, it is possible to obtain an image having desirable density regardless of the amount of exposure of the stimulable phosphor sheet to the radiation, by reading out the emitted light with an appropriate read-out gain and converting it into electric signals to reproduce a visible image on a recording medium or a display device.

In the case where the aforesaid radiation image recording and reproducing system is used for diagnosis of the human body, the radiation dose to the human body can be decreased markedly as compared with the conventional X-ray image recording diagnosis system.

However, as the dose of radiation irradiated to the object at the time of the image recording is decreased, adverse effects of quantum noise of radiation or the like on the radiation image increase. As a result, graininess of the image deteriorates, and the reproduced visible image becomes rough.

In order to improve the graininess, the apparatus may be devised as described below. For example, a blur image may be stored on the stimulable phosphor sheet at the time of the image recording by making the stimulable phosphor sheet thicker or by making larger the grains of the stimulable phosphor used in the stimulable phosphor sheet. Alternatively, the image may be blurred at the time of the image read-out by increasing the beam diameter of stimulating rays used for the scanning, or the read-out image may be blurred by feeding the read-out analog image signals into an analog filter. Fine control is necessary in order to improve the graininess while deterioration of the other image quality factors such as sharpness are being minimized. However, with the aforesaid approaches to the improvement of the graininess, the kind of the stimulable phosphor sheet must be increased, and the degree of freedom of the control is limited even though the kind of the stimulable phosphor sheet is increased. Also, the degree of freedom of the control is very low though the mechanism becomes complicated, and the control is possible only in the direction of flow of the sequential image signals (the direction of main scanning). On the other hand, in order to improve the graininess by image processing, frequency response processing may be carried out by use of FFT (fast Fourier transform), or the image may be digitally blurred by calculating a mean value of the image signals around each scanning point. With the method using FFT, the degree of freedom of the control is very high. However, with this method, the processing speed is too low to process large numbers of the image signals, and a high cost is required to increase the processing speed. With the method wherein the image is digitally blurred by use of the mean value, fine control cannot be achieved and the image is generally blurred excessively even though the processing can be carried out quickly.

SUMMARY OF THE INVENTION

The primary object of the present invention is to provide a radiation image processing method which improves graininess of a radiation image while deterioration of other image quality factors is being minimized, and which is carried out without an apparatus being caused to become complicated and in an operation time within a substantially allowable range, and an apparatus for carrying out the method.

Another object of the present invention is to provide a radiation image processing method which improves the overall image quality by improving the sharpness, contrast and the like while grain noise of the radiation image is being restricted, and which is carried out without an apparatus being caused to become complicated and in an operation time within a substantially allowable range, and an apparatus for carrying out the method.

A further object of the present invention is to provide an X-ray image processing method which improves graininess of an X-ray image while deterioration of other image quality factors is being minimized, and which is carried out without an apparatus being caused to become complicated and in an operation time within a substantially allowable range, and an apparatus for carrying out the method.

A still further object of the present invention is to provide an X-ray image processing method which improves the overall image quality by improving the sharpness, contrast and the like while grain noise of the X-ray image is being restricted, and which is carried out without an apparatus being caused to become complicated and in an operation time within a substantially allowable range, and an apparatus for carrying out the method.

The present invention provides a first radiation image processing method which comprises the steps of:

in the course of scanning a stimulable phosphor carrying a radiation image stored thereon by stimulating rays which cause said stimulable phosphor to emit light in proportion to the stored radiation energy, obtaining an original image signal by photoelectrically detecting the light emitted by each scanning point of said stimulating rays on said stimulable phosphor, and reproducing said radiation image as a visible image on a recording medium, i) obtaining a single unsharp mask signal Sus.k by averaging original image signals within a predetermined range surrounding each scanning point or image signals obtained by carrying out intermediate processing of the original image signals, or obtaining a plurality of unsharp mask signals Sus.k, where k=1, 2, ..., n wherein n denotes an integer representing the number of said unsharp mask signals, by changing said predetermined range, ii) denoting a single attenuation coefficient corresponding to single said unsharp mask signal or a plurality of attenuation coefficients corresponding to a plurality of said unsharp mask signals by $\beta k$ where k=1, 2, ..., n, iii) adjusting at least a single attenuation coefficient $\beta l$, where l denotes an integer within the range of 1 to n, among said attenuation coefficients $\beta k$, where k=1, 2, ..., n, to be a constant within the range of $0 < \beta l$ wherein $\beta l \neq 1$, iv) carrying out an operation represented by a formula $$S' = Sb1 - \sum_{k=1}^{n} \beta k (Sb2 - Sus \cdot k)$$

where Sb1 and Sb2 each denote said original image signal or an image signal obtained by carrying out intermediate processing of said original image signal, and S' denotes an image signal obtained by the operation processing, by use of said attenuation coefficient $\beta l$, and v) attenuating spatial frequency components above the spatial frequency component which the unsharp mask signal Sus.l corresponding to said attenuation coefficient $\beta l$ has.

The first radiation image processing method in accordance with the present invention is carried out by a first radiation image processing apparatus in a radiation image recording and reproducing system for scanning a stimulable phosphor carrying a radiation image stored thereon by stimulating rays which cause said stimulable phosphor to emit light in proportion to the stored radiation energy, obtaining an original image signal by photoelectrically detecting the light emitted by each scanning point of said stimulating rays on said stimulable phosphor, processing the original image signal by an operation device, and reproducing said radiation image as a visible image on a recording medium by use of the processed image signal, wherein the improvement comprises constituting said operation device for:

i) obtaining a single unsharp mask signal Sus.k by averaging original image signals within a predetermined range surrounding each scanning point or image signals obtained by carrying out intermediate processing of the original image signals, or obtaining a plurality of unsharp mask signals Sus.k, where k=1, 2, ..., n wherein n denotes an integer representing the number of said unsharp mask signals, by changing said predetermined range, ii) denoting a single attenuation coefficient corresponding to single said unsharp mask signal or a plurality of attenuation coefficients corresponding to a plurality of said unsharp mask signals by $\beta k$ where k=1, 2, ..., n, iii) adjusting at least a single attenuation coefficient $\beta l$, where l denotes an integer within the range of 1 to n, among said attenuation coefficients $\beta k$, where k=1, 2, ..., n, to be a constant within the range of $0 < \beta l$ wherein $\beta l \neq 1$ and iv) carrying out an operation represented by a formula $$S' = Sb1 - \sum_{k=1}^{n} \beta k (Sb2 - Sus \cdot k)$$

where Sb1 and Sb2 each denote said original image signal or an image signal obtained by carrying out intermediate processing of said original image signal, and S' denotes an image signal obtained by the operation processing, by use of said attenuation coefficient $\beta l$.

With the first radiation image processing method in accordance with the present invention, at least a single attenuation coefficient $\beta l$ among the attenuation coefficients $\beta k$, where k=1, 2, ..., n, is adjusted to be a constant within the range of $0 < \beta l$ wherein $\beta l \neq 1$, and the operation represented by the formula $$S' = Sb1 - \sum_{k=1}^{n} \beta k (Sb2 - Sus.k) \tag{1}$$

is carried out.

Formula (1) can be rewritten into the form of $$S' = Sb1 - \beta l(Sb2 - Sus.l) - \sum_{k=1}^{l-1} \beta k(Sb2 - Sus.k) - \tag{2}$$

-continued $$\sum_{k=l+1}^{n} \beta k(Sb2 - Sus.k)$$

As for the second term $\beta 1(Sb2-Sus.l)$ of Formula (2), the unsharp mask signal Sus.l is subtracted from Sb2 which is, by way of example, the original image signal as represented by Sb2−Sus.l in the parentheses of the second term, whereby the low spatial frequency component which the unsharp mask signal Sus.l has is subtracted from Sb2. Also, Sb2−Sus.l is multiplied by the attenuation coefficient $\beta 1$ satisfying the condition of $0<\beta 1$ wherein $\beta 1\neq 1$ as represented by $\beta 1(Sb2-Sus.l)$, and $\beta 1(Sb2-Sus.l)$ is subtracted from Sb1 which is, by way of example, the original image signal. In this manner, the high spatial frequency component which Sb2−Sus.l has can be attenuated from the signal Sb1. In the case where the high spatial frequency component is made to coincide with grainy noise of the image and the attenuation coefficient $\beta 1$ is adjusted to be an appropriate value satisfying the condition of $0<\beta 1$ wherein $\beta 1\neq 1$, grainy noise of the image can be attenuated, and deterioration of other image quality factors such as sharpness can be minimized. Also, the first radiation image processing apparatus for carrying out the first radiation image processing method is not complicated as compared with the radiation image processing apparatuses in the radiation image recording and reproducing system proposed by the applicant in, for example, U.S. Pat. No. 4,258,264 and Japanese Unexamined Patent Publication No. 56(1981)-11395, and can achieve the operation in a time within a substantially allowable range. The original image signal obtained by the photoelectric detection may be used as the image signals Sb1 and Sb2, or an image signal obtained by carrying out intermediate processing of the original image signal may be used as one or both of the image signals Sb1 and Sb2.

The third and fourth terms of Formula (2) will now be described below. Grainy noise has a wide range of spatial frequency components. Therefore, in the case where grainy noise cannot be substantially restricted by the combination of the first term with the second term of Formula (2), the same operation as the second term is carried out in the third term or the fourth term by changing the spatial frequency region from the frequency region in the second term. Also, an attenuation coefficient $\beta m$ where $m\neq 1$ may be adjusted so that $\beta m<0$ in the third and fourth term and, for example, an operation for emphasizing specific spatial frequency components as proposed by the applicant in U.S. Pat. No. 4,315,318 may be used in combination.

Basic differences between the first radiation image processing method in accordance with the present invention and the method as proposed by the applicant in, for example, U.S. Pat. No. 4,315,318 will now be described below. In the proposed method, an operation represented by a formula $$S' = Sorg + \beta(Sorg - Sus) \quad (3)$$

where Sus denotes an unsharp mask signal, Sorg denotes an original image signal, $\beta$ denotes an emphasis coefficient, and S' denotes a signal obtained by processing, is carried out for emphasizing specific spatial frequency components.

The simplest formula of the first radiation image processing method in accordance with the present invention comprises only the first term and the second term of Formula (2), i.e. is expressed as $$S' = Sb1 - \beta 1(Sb2 - Sus.l) \quad (4)$$

As mentioned above, Formula (4) indicates that the spatial frequency components which grainy noise has are attenuated positively.

However, it was found by the inventors of U.S. Pat. No. 4,315,318 that the spatial frequency that grain noise has overlaps the spatial frequency affecting other image quality factors such as sharpness. Therefore, it is considered that in the case where the spatial frequency that grain noise has is attenuated positively, other image quality factors will deteriorate to an unrestorable extent. Accordingly, the image quality has heretofore been improved by emphasizing the spatial frequency components having a comparatively high degree of contribution to other image quality factors such as sharpness, instead of the graininess, without positively attenuating the spatial frequency components which grain noise has.

The inventors of the present invention studied the properties of grainy noise and found that grainy noise can be rendered imperceptible while deterioration of other image quality factors such as sharpness is being minimized by accurately selecting the spatial frequency which is to be attenuated and the extent of attenuation of said spatial frequency, and positively restricting the spatial frequency components which grainy noise has. The optimal value of the attenuation coefficient $\beta 1$ employed for carrying out the attenuation is generally present in the range of $0<\beta 1<1$, depending on the kind of the radiation image or the like.

As mentioned above, with the first radiation image processing method in accordance with the present invention, after the original image signal is obtained by scanning the stimulable phosphor carrying a radiation image stored thereon by stimulating rays which cause the stimulable phosphor to emit light in proportion to the stored radiation energy, and photoelectrically detecting the light emitted by each scanning point of the stimulating rays on the stimulable phosphor, at least a single attenuation coefficient $\beta 1$ among the attenuation coefficients $\beta k$ where $k=1, 2, \ldots, n$ is adjusted to be a constant within the range of $$0<l \text{ wherein } \beta 1\neq 1,$$

and the operation represented by the formula $$S' = Sb1 - \sum_{k=1}^{n} \beta k(Sb2 - Sus \cdot k)$$

is carried out. Therefore, the spatial frequency components above the spatial frequency component which the unsharp mask signal Sus.l has can be attenuated, grainy noise of the radiation image can be attenuated efficiently, and deterioration of other image quality factors can be minimized. Also, the apparatus for carrying out the first radiation image processing method in accordance with the present invention is not so complicated and can achieve the operation in a time within a substantially allowable range.

The present invention also provides a second radiation image processing method which comprises the steps of:

in the course of scanning a stimulable phosphor carrying a radiation image stored thereon by stimulating rays which cause said stimulable phosphor to emit light in proportion to the stored radiation energy, obtaining an original image signal by photoelectrically detecting the light emitted by each scanning point of said stimulating rays on said stimulable phosphor, and reproducing said radiation image as a visible image on a recording medium, i) obtaining a single unsharp mask signal Sus.k by averaging original image signals within a predetermined range surrounding each scanning point or image signals obtained by carrying out intermediate processing of the original image signals, or obtaining a plurality of unsharp mask signals Sus.k, where k=1, 2, ..., n wherein n denotes an integer representing the number of said unsharp mask signals, by changing said predetermined range, ii) denoting a single attenuation coefficient corresponding to single said unsharp mask signal or a plurality of attenuation coefficients corresponding to a plurality of said unsharp mask signals by $\beta k$ where k=1, 2, ..., n, iii) adjusting at least a single attenuation coefficient $\beta l$, where l denotes an integer within the range of 1 to n, among said attenuation coefficients $\beta k$, where k=1, 2, ..., n, to be a variable which is always within the range of $$0 \leq \beta l$$

and which varies in each said radiation image, iv) carrying out an operation represented by a formula $$S' = Sb1 - \sum_{k=1}^{n} \beta k(Sb2 - Sus \cdot k)$$

where Sb1 and Sb2 each denote said original image signal or an image signal obtained by carrying out intermediate processing of said original image signal, and S' denotes an image signal obtained by the operation processing, by use of said attenuation coefficient $\beta l$, and v) attenuating spatial frequency components above the spatial frequency component which the unsharp mask signal Sus.l corresponding to said attenuation coefficient $\beta l$ has.

The second radiation image processing method in accordance with the present invention is carried out by a second radiation image processing apparatus in a radiation image recording and reproducing system for scanning a stimulable phosphor carrying a radiation image stored thereon by stimulating rays which cause said stimulable phosphor to emit light in proportion to the stored radiation energy, obtaining an original image signal by photoelectrically detecting the light emitted by each scanning point of said stimulating rays on said stimulable phosphor, processing the original image signal by an operation device, and reproducing said radiation image as a visible image on a recording medium by use of the processed image signal, wherein the improvement comprises constituting said operation device for:

i) obtaining a single unsharp mask signal Sus.k by averaging original image signals within a predetermined range surrounding each scanning point or image signals obtained by carrying out intermediate processing of the original image signals, or obtaining a plurality of unsharp mask signals Sus.k, where k=1, 2, ..., n wherein n denotes an integer representing the number of said unsharp mask signals, by changing said predetermined range, ii) denoting a single attenuation coefficient corresponding to single said unsharp mask signal or a plurality of attenuation coefficients corresponding to a plurality of said unsharp mask signals by $\beta k$ where k=1, 2, ..., n, iii) adjusting at least a single attenuation coefficient $\beta l$, where l denotes an integer within the range of 1 to n, among said attenuation coefficients $\beta k$, where k=1, 2, ..., n, to be a variable which is always within the range of $$0 \leq \beta l$$

and which varies in each said radiation image, and iv) carrying out an operation represented b) a formula $$S' = Sb1 - \sum_{k=1}^{n} \beta k(Sb2 - Sus \cdot k)$$

where Sb1 and Sb2 each denote said original image signal or an image signal obtained by carrying out intermediate processing of said original image signal, and S' denotes an image signal obtained by the operation processing, by use of said attenuation coefficient $\beta l$.

With the second radiation image processing method in accordance with the present invention, at least a single attenuation coefficient $\beta l$ among the attenuation coefficients $\beta k$, where k=1, 2, ..., n, is adjusted to be a variable always having a value within the range of $$0 \leq \beta l$$

and the operation represented by the formula $$S' = Sb1 - \sum_{k=1}^{n} \beta k(Sb2 - Sus.k) \quad (5)$$

is carried out.

Formula (5) can be rewritten into the form of $$S' = Sb1 - \beta l(Sb2 - Sus.l) - \sum_{k=1}^{l-1} \beta k(Sb2 - Sus.k) - \sum_{k=l+1}^{n} \beta k(Sb2 - Sus.k) \quad (6)$$

As for the second term $\beta l(Sb2-Sus.l)$ of Formula (6), the unsharp mask signal Sus.l is subtracted from Sb2 which is, by way of example, the original image signal as represented by Sb2−Sus.l in the parentheses of the second term, whereby the low spatial frequency component which the unsharp mask signal Sus.l has is subtracted from Sb2. Also, Sb2−Sus.l is multiplied by the attenuation coefficient $\beta l$ satisfying the condition of $0 \leq \beta l$ as represented by $\beta l(Sb2-Sus.l)$, and $\beta l(Sb2-Sus.l)$ is subtracted from Sb1 which is, by way of example, the original image signal. In this manner, in the region of $\beta l \leq 0$ (where $\beta l$ is the variable varying in the radiation image) inside of the radiation image, the high spatial frequency component which Sb2−Sus.l has can be attenuated from the signal Sb1. In the case where the high spatial frequency component is made to coincide with grainy noise of the image and the attenuation coefficient $\beta 1$ is adjusted to be an appropriate value as the variable varying within the range of $0 \leq \beta 1$, grainy noise of the image can be attenuated, and deterioration of other image quality factors such as sharpness can be minimized in accordance with the condition of each region inside of a single image. Also, the second radiation image processing apparatus for carrying out the second radiation image processing method is not complicated as compared with the radiation image processing apparatuses in the radiation image recording and reproducing system proposed by the applicant in, for example, U.S. Pat. No. 4,258,264 and Japanese Unexamined Patent Publication No. 56(1981)-11395, and can achieve the operation in a time within a substantially allowable range. The original image signal obtained by the photoelectric detection may be used as the image signals Sb1 and Sb2, or an image signal obtained by carrying out intermediate processing of the original image signal may be used as one or both of the image signals Sb1 and Sb2.

The third and fourth terms of Formula (6) will now be described below. Grainy noise has a wide range of spatial frequency components. Therefore, in the case where grainy noise cannot be substantially restricted by the combination of the first term with the second term of Formula (6) or finer image processing is to be carried out by changing the spatial frequency region for each region inside of a single image area, the same operation as the second term is carried out in the third term or the fourth term by changing the spatial frequency region from the frequency region in the second term. Also, an attenuation coefficient $\beta m$ where $m < 1$ may be adjusted so that $\beta m < 0$ in the third and fourth term and, for example, an operation for emphasizing specific spatial frequency components as proposed by the applicant in U.S. Pat. No. 4,315,318 may be used in combination.

The simplest formula of the second radiation image processing method in accordance with the present invention comprises only the first term and the second term of Formula (6), i.e. is expressed as $$S' = Sb1 \, \beta 1(Sb2 - Sus.1) \tag{7}$$

As mentioned above, Formula (7) indicates that the spatial frequency components which grainy noise has are attenuated positively.

In the case where the attenuation coefficient $\beta 1$ for carrying out the attenuation is varied within the range of $0 \leq \beta < 1$, it can optimize each region inside of the image for almost every image. As for the attenuation coefficient $\beta 1$, various function forms may be selected in accordance with the purpose of image processing or the like. For example, the attenuation coefficient $\beta 1$ may be adjusted to be a function of the image signals such that a portion of a low image density in the radiation image where grainy noise is comparatively perceptible is blurred by increasing the extent of the attenuation, and the extent of the attenuation is decreased for a portion of a high image density where grainy noise is comparatively imperceptible to make the detailed structure sharper. Alternatively, the attenuation coefficient $\beta 1$ may be varied in accordance with the object portion inside of a single image such as a bone portion, a lung portion or a heart portion in the radiation image of the chest of the human body so that image processing is carried out to be suitable for each object portion.

As mentioned above, with the second radiation image processing method in accordance with the present invention, after the original image signal is obtained by scanning the stimulable phosphor carrying a radiation image stored thereon by stimulating rays which cause the stimulable phosphor to emit light in proportion to the stored radiation energy, and photoelectrically detecting the light emitted by each scanning point of the stimulating rays on the stimulable phosphor, at least a single attenuation coefficient $\beta 1$ among the attenuation coefficients $\beta k$ where $k = 1, 2, \ldots, n$ is adjusted to be a variable which is always within the range of $$0 \leq \beta 1$$

and which varies in each radiation image, and the operation represented by the formula $$S' = Sb1 - \sum_{k=1}^{n} \beta k(Sb2 - Sus \cdot k)$$

is carried out. Therefore, the spatial frequency components above the spatial frequency component which the unsharp mask signal Sus.1 has can be attenuated. Also, grainy noise of the radiation image can be attenuated efficiently, and deterioration of other image quality factors can be minimized in accordance with each region inside of the radiation image. Moreover, the apparatus for carrying out the second radiation image processing method in accordance with the present invention is not so complicated and can achieve the operation in a time within a substantially allowable range.

The present invention further provides a third radiation image processing method which comprises the steps of:

in the course of scanning a stimulable phosphor carrying a radiation image stored thereon by exposure to radiation by stimulating rays which cause said stimulable phosphor to emit light in proportion to the stored radiation energy, obtaining an original image signal by photoelectrically detecting the light emitted by each scanning point of said stimulating rays on said stimulable phosphor, and reproducing said radiation image as a visible image on a recording medium, i) obtaining an unsharp mask signal Sus by averaging original image signals within a predetermined range surrounding each scanning point, ii) denoting a coefficient corresponding to said unsharp mask signal Sus by $\beta$, iii) adjusting said coefficient $\beta$ to be a function shifting from $\beta < 0$ to $\beta > 0$ as a dose of said radiation irradiated to each point on said stimulable phosphor increases, iv) carrying out an operation represented by a formula $$S' = Sorg + \beta(Sorg - Sus) \tag{8}$$

where Sorg denotes said original image signal, and S' denotes an image signal obtained by the operation processing, by use of said coefficient $\beta$, and v) attenuating spatial frequency components above the spatial frequency component which said unsharp mask signal Sus has in a region of a low radiation dose inside of single said radiation image, and emphasizing the spatial frequency components above the spatial frequency component which said unsharp mask signal Sus has in a region of a high radiation dose inside of single said radiation image.

Other operations as well as the operation corresponding to Formula (8) may also be contained in the third radiation image processing method in accordance with the present invention. Specifically, the present invention also provides a fourth radiation image processing method which comprises the steps of:

in the course of scanning a stimulable phosphor carrying a radiation image stored thereon by exposure to radiation by stimulating rays which cause said stimulable phosphor to emit light in proportion to the stored radiation energy, obtaining an original image signal by photoelectrically detecting the light emitted by each scanning point of said stimulating rays on said stimulable phosphor, and reproducing said radiation image as a visible image on a recording medium, i) obtaining a single unsharp mask signal Sus.k by averaging original image signals within a predetermined range surrounding each scanning point or image signals obtained by carrying out intermediate processing of the original image signals, or obtaining a plurality of unsharp mask signals Sus.k, where k=1, 2, ..., n wherein n denotes an integer representing the number of said unsharp mask signals, by changing said predetermined range, ii) denoting a single coefficient corresponding to single said unsharp mask signal or a plurality of coefficients corresponding to a plurality of said unsharp mask signals by $\beta k$ where k=1, 2, ..., n, iii) adjusting at least a single coefficient $\beta l$, where l denotes an integer within the range of 1 to n, among said coefficients $\beta k$, where k=1, 2, ..., n, to be a function shifting from $\beta l<0$ to $\beta l>0$ as a dose of said radiation irradiated to each point on said stimulable phosphor increases, iv) carrying out an operation represented by a formula $$S' = Sb1 + \sum_{k=1}^{n} \beta k(Sb2 - Sus.k) \quad (9)$$

where Sb1 and Sb2 each denote said original image signal or an image signal obtained by carrying out intermediate processing of said original image signal, and S' denotes an image signal obtained by the operation processing, by use of said coefficient $\beta l$, and v) attenuating spatial frequency components above the spatial frequency component which the unsharp mask signal Sus.l corresponding to said coefficient $\beta l$ has in a region of a low radiation dose inside of single said radiation image, and emphasizing the spatial frequency components above the spatial frequency component which the unsharp mask signal Sus.l corresponding to said coefficient $\beta l$ has in a region of a high radiation dose inside of single said radiation image.

The third radiation image processing method in accordance with the present invention is carried out by a third radiation image processing apparatus in a radiation image recording and reproducing system for scanning a stimulable phosphor carrying a radiation image stored thereon by exposure to radiation by stimulating rays which cause said stimulable phosphor to emit light in proportion to the stored radiation energy, obtaining an original image signal by photoelectrically detecting the light emitted by each scanning point of said stimulating rays on said stimulable phosphor, processing the original image signal by an operation device, and reproducing said radiation image as a visible image on a recording medium by use of the processed image signal, wherein the improvement comprises constituting said operation device for:

i) obtaining an unsharp mask signal Sus by averaging original image signals within a predetermined range surrounding each scanning point, ii) denoting a coefficient corresponding to said unsharp mask signal Sus by $\beta$, iii) adjusting said coefficient $\beta$ to be a function shifting from $\beta<0$ to $\beta>0$ as a dose of said radiation irradiated to each point on said stimulable phosphor increases, and iv) carrying out an operation represented by a formula $$S' = Sorg + \beta(Sorg - Sus) \quad (10)$$

where Sorg denotes said original image signal, and S' denotes an image signal obtained by the operation processing, by use of said coefficient $\beta$.

The third radiation image processing apparatus for carrying out the third radiation image processing method in accordance with the present invention may be provided with a function of carrying out other operations as well as the operation corresponding to Formula (10).

Specifically, the present invention further provides a fourth radiation image processing apparatus in a radiation image recording and reproducing system for scanning a stimulable phosphor carrying a radiation image stored thereon by exposure to radiation by stimulating rays which cause said stimulable phosphor to emit light in proportion to the stored radiation energy, obtaining an original image signal by photoelectrically detecting the light emitted by each scanning point of said stimulating rays on said stimulable phosphor, processing the original image signal by an operation device, and reproducing said radiation image as a visible image on a recording medium by use of the processed image signal, wherein the improvement comprises constituting said operation device for:

i) obtaining a single unsharp mask signal Sus.k by averaging original image signals within a predetermined range surrounding each scanning point or image signals obtained by carrying out intermediate processing of the original image signals, or obtaining a plurality of unsharp mask signals Sus.k, where k=1, 2, ..., n wherein n denotes an integer representing the number of said unsharp mask signals, by changing said predetermined range, ii) denoting a single coefficient corresponding to single said unsharp mask signal or a plurality of coefficients corresponding to a plurality of said unsharp mask signals by $\beta k$ where k=1, 2, ..., n, iii) adjusting at least a single coefficient $\beta l$, where l denotes an integer within the range of 1 to n, among said coefficients $\beta k$, where k=1, 2, ..., n, to be a function shifting from $\beta l<0$ to $\beta l>0$ as a dose of said radiation irradiated to each point on said stimulable phosphor increases, and iv) carrying out an operation represented by a formula $$S' = Sb1 + \sum_{k=1}^{n} \beta k(Sb2 - Sus.k) \quad (11)$$

where Sb1 and Sb2 each denote said original image signal or an image signal obtained by carrying out intermediate processing of said original image signal, and S' denotes an image signal obtained by the operation processing, by use of said coefficient $\beta1$.

The term "shifting from $\beta<0$ to $\beta>0$" as used herein for the third radiation image processing method and apparatus and the term "shifting from $\beta1<0$ to $\beta1>0$" as used herein for the fourth radiation image processing method and apparatus embrace the case where, as shown in FIG. 5C by way of example, a region of $\beta=0$ or $\beta1=0$ is present at an intermediate region.

In the course of the operations expressed as Formulas (8) to (11), a signal (Sorg=k·E where k is a constant) proportional to the optical amount E of the light emitted by the stimulable phosphor may be used as the original image signal Sorg, and the operations may be carried out by use of Sus, $\beta$, Sus.k, $\beta$k, Sb1 and Sb2 corresponding to said signal. Alternatively, from the viewpoint of signal amount compression or the like, the original image signal (Sorg=k'·log E where k' is a constant) proportional to a logarithmic value of the optical amount E of the light emitted by the stimulable phosphor may be used, and the operations may be carried out by use of Sus, $\beta$, Sus.k, $\beta$k, Sb1 and Sb2 corresponding to said original image signal.

In general, both a region of a high radiation dose and a region of a low radiation dose are present in a single radiation image in accordance with the distribution of various tissues constituting the object, a difference in thickness of the object, and the like. In the case where the image signals obtained by the image read-out are uniformly subjected to an operation for emphasizing the contrast, the sharpness and the like by use of the method disclosed in, for example, U.S. Pat. No. 4,315,318, grain noise is emphasized and the image becomes rough in the region of a low radiation dose including more grain noise even though the image quality is improved in the region of a high radiation dose originally including less grain noise. On the other hand, in the case where grain noise is positively reduced by use of the aforesaid second radiation image processing method in accordance with the present invention in order to restrict grain noise in the region of a low radiation dose, the sharpness and the contrast are deteriorated slightly in the region of a high radiation dose. With both of these methods, it is necessary for image processing to be carried out by ascertaining the balance among the image quality factors of the overall image.

In the third radiation image processing method in accordance with the present invention, by considering that both the region of a high radiation dose and the region of a low radiation dose are present in a single radiation image, the coefficient $\beta$ is shifted from $\beta<0$ to $\beta>0$ as the radiation dose increases in the course of carrying out image processing represented by Formula (8).

In this manner, grain noise can be reduced positively in the region of a low radiation dose including more grain noise in the radiation image, and the image quality factors such as the sharpness and the contrast can be improved positively in the region of a high radiation dose originally including less grain noise in the radiation image. Therefore, the image quality of a reproduced visible image can be improved markedly over the case where image processing is carried out uniformly for the overall image.

The radiation dose in each region of the radiation image is approximately proportional to the light emitted by the stimulable phosphor when the stimulable phosphor is scanned by stimulating rays. Therefore, the radiation dose in each region of the radiation image can be detected by investigating the image signal obtained by photoelectrically detecting the emitted light.

Also, in order to carry out image processing suitable for each region of the radiation image as mentioned above, the method as disclosed in U.S. Pat. No. 4,315,318 and the second radiation image processing method in accordance with the present invention may be combined with each other, and an operation may be carried out as represented by a formula $$S' = Sorg - \beta'(Sorg - Sus') + \beta''(Sorg - Sus'') \quad (12)$$

where Sorg denotes the original image signal, Sus' and Sus'' denote unsharp mask signals subjected to appropriate frequency response processing, $\beta'$ and $\beta''$ ($\beta'$, $\beta''>0$) denote coefficients each having an appropriate function form as the function of the image signal (the function of the radiation dose), and S' denotes the image signal obtained by processing. However, with this method, both the operation of the second term $\beta'$(Sorg−Sus') and the operation of the third term $\beta''$(Sorg−Sus'') must at least be carried out for each scanning point on the radiation image.

On the other hand, in the case where Formula (8) which is the most basic formula in the third radiation image processing method in accordance with the present invention is used, only a single term of $\beta$(Sorg−Sus) may be calculated, and the operation can be completed in a time approximately half the operation time of Formula (12). Also, in the case where the apparatus is constituted to carry out the operation by hardware, the apparatus configuration is simplified markedly.

As indicated by Formula (9), the fourth radiation image processing method in accordance with the present invention includes other operations as well as the operation represented by Formula (8). Formula (9) can be rewritten into the form of $$S' = Sb1 + \beta l(Sb2 - Sus.l) + \sum_{k=1}^{l-1} \beta k(Sb2 - Sus.k) + \sum_{k=l+1}^{n} \beta k(Sb2 - Sus.k) \quad (13)$$

When the first term Sb1 and Sb2 of the second term in Formula (13) are expressed as the original image signal Sorg, the combination Sb1+$\beta$l(Sb2−Sus.l) of the first term with the second term becomes identical with Formula (8). Specifically, for a single radiation image, various kinds of image processing such as various kinds of noise reducing processing and window processing for taking up only the necessary spatial frequency components are often carried out as well as the processing in accordance with the present invention. Therefore, in the course of using the fourth radiation image processing method in accordance with the present invention, the original image signal Sorg obtained by reading out the radiation image need not necessarily be used directly, and an image signal obtained by subjecting the original image signal Sorg to intermediate processing, for example, of the type as mentioned above may be used. Also, in this case, nearly the same effects as Formula (8) can be obtained, and the operation can be combined efficiently with other operation processing. The image signal obtained by intermediate processing may also be the image signal generated in the course of carrying out the fourth radiation image processing method in accordance with the present invention.

The third and fourth terms of Formula (13) will now be described below. Spatial frequency components of grainy noise and spatial frequency components carrying the image quality factors such as the sharpness and the contrast are present over wide ranges. Therefore, in the case where image processing is to be carried out more finely than image processing using the combination of the first term with the second term of Formula (13), the same operation as the second term is carried out in the third term or the fourth term by changing the spatial frequency region from the frequency region in the second term.

Also, a coefficient $\beta m$ where $m \neq 1$ may be adjusted so that $\beta m > 0$ in the third and fourth terms and, for example, an operation for emphasizing specific spatial frequency components as proposed by the applicant in U.S. Pat. No. 4,315,318 may be carried out over the overall image in order to compensate the operation of the first and second terms. Also, a coefficient $\beta n$ where $n \neq 1$ may be adjusted so that $\beta n < 0$, and the operation for reducing grain noise in accordance with the second radiation image processing method of the present invention may be carried out over the overall image.

As mentioned above, the operation time of the operation of the first and second terms of Formula (13), i.e. the operation corresponding to the operation represented by Formula (8), is markedly shortened as compared with the operation represented by Formula (12) or the like. Therefore, finer image processing can be achieved by carrying out the operation of the third and fourth terms as mentioned above by the utilization of the margin time.

With the third and fourth radiation image processing apparatuses in accordance with the present invention wherein the operation device is provided with the function of the aforesaid operation processing, the software execution time can be shortened in the case where the function is achieved by the software, or the apparatus configuration can be simplified in the case where the function is achieved by the hardware.

As mentioned above, with the third radiation image processing method in accordance with the present invention, after the original image signal is obtained by scanning the stimulable phosphor carrying a radiation image stored thereon by exposure to radiation by stimulating rays which cause the stimulable phosphor to emit light in proportion to the stored radiation energy, and photoelectrically detecting the light emitted by each scanning point of the stimulating rays on the stimulable phosphor, the operation represented by the formula $$S' = Sorg + \beta(Sorg - Sus) \quad (8)$$

is carried out by using the coefficient $\beta$ shifting from $\beta < 0$ to $\beta > 0$ as the dose of radiation irradiated to each point on the stimulable phosphor increases. Therefore, grain noise can be reduced in the region of a low radiation dose including more grain noise in the radiation image, and the image quality factors such as the sharpness and the contrast can be improved positively in the region of a high radiation dose originally including less grain noise in the radiation image. As a result, the image quality of the overall image can be improved.

Also, as the operation represented by Formula (8) can be completed in a short operation time, finer image processing can be carried out as represented by Formula (9)

$$S' = Sb1 + \sum_{k=1}^{n} \beta k(Sb2 - Sus.k) \quad (9)$$

by the utilization of the margin time in accordance with the fourth radiation image processing method of the present invention.

Furthermore, the apparatuses for carrying out the third and fourth radiation image processing methods in accordance with the present invention are not so complicated and can achieve the operation in a time within a substantially allowable range.

The present invention still further provides a first X-ray image processing method which comprises the steps of:

in the course of scanning an original photograph carrying an X-ray image recorded thereon, reading out an original image density at each scanning point on said original photograph, and reproducing said X-ray image as a visible image on a copy photograph or the like, i) obtaining a single unsharp mask by averaging original image densities within a predetermined range surrounding each scanning point or image densities obtained by carrying out intermediate processing of signals representing the original image densities, or obtaining a plurality of unsharp masks by changing said predetermined range, and denoting densities of said unsharp masks by Dus.k, where k = 1, 2, ..., n wherein n denotes an integer representing the number of said unsharp masks, ii) denoting a single attenuation coefficient corresponding to single said unsharp mask or a plurality of attenuation coefficients corresponding to a plurality of said unsharp masks by $\beta k$ where k = 1, 2, ..., n, iii) adjusting at least a single attenuation coefficient $\beta 1$, where l denotes an integer within the range of 1 to n, among said attenuation coefficients $\beta k$, where k = 1, 2, ..., n, to be a constant within the range of $$0 < \beta 1 \text{ wherein } \beta 1 \neq 1,$$

iv) carrying out an operation represented by a formula $$D' = Db1 - \sum_{k=1}^{n} \beta k(Db2 - Dus.k)$$

where Db1 and Db2 each denote said original image density or an image density obtained by carrying out intermediate processing of a signal representing said original image density, and D' denotes an image density obtained by the operation processing, by use of said attenuation coefficient $\beta 1$, and v) attenuating spatial frequency components above the spatial frequency component which the density Dus.l of the unsharp mask corresponding to said attenuation coefficient $\beta 1$ has.

The first X-ray image processing method in accordance with the present invention is carried out by a first X-ray image processing apparatus for processing a signal representing an original image density, which has been read out at each scanning point on an original photograph carrying an X-ray image recorded thereon by scanning said original photograph, by an operation device, and reproducing said X-ray image as a visible image on a copy photograph or the like by use of the signal representing the processed image density, wherein the improvement comprises constituting said operation device for:

i) obtaining a single unsharp mask by averaging original image densities within a predetermined range surrounding each scanning point or image densities obtained by carrying out intermediate processing of signals representing the original image densities, or obtaining a plurality of unsharp masks by changing said predetermined range, and denoting densities of said unsharp masks by Dus.k, where k=1, 2, ..., n wherein n denotes an integer representing the number of said unsharp masks, ii) denoting a single attenuation coefficient corresponding to single said unsharp mask or a plurality of attenuation coefficients corresponding to a plurality of said unsharp masks by $\beta k$ where k=1, 2, ..., n, iii) adjusting at least a single attenuation coefficient $\beta l$, where l denotes an integer within the range of 1 to n, among said attenuation coefficients $\beta k$, where k=1, 2, ..., n, to be a constant within the range of $0 < \beta l$ wherein $\beta l \neq 1$, and iv) carrying out an operation represented by a formula $$D' = Db1 - \sum_{k=1}^{n} \beta k(Db2 - Dus.k)$$

where Db1 and Db2 each denote said original image density or an image density obtained by carrying out intermediate processing of a signal representing said original image density, and D' denotes an image density obtained by the operation processing, by use of said attenuation coefficient $\beta l$.

With the first X-ray image processing method in accordance with the present invention, at least a single attenuation coefficient $\beta l$ among the attenuation coefficients $\beta k$, where k=1, 2, ..., n, is adjusted to be a constant within the range of $0 < \beta l$ wherein $\beta l \neq 1$, and the operation represented by the formula $$D' = Db1 - \sum_{k=1}^{n} \beta k(Db2 - Dus.k) \quad (14)$$

is carried out.

Formula (14) can be rewritten into the form of $$D' = Db1 - \beta l(Db2 - Dus.l) - \sum_{k=1}^{l-1} \beta k(Db2 - Dus.k) - \sum_{k=l+1}^{n} \beta k(Db2 - Dus.k) \quad (15)$$

As for the second term $\beta l(Db2-Dus.l)$ of Formula (15), the unsharp mask density Dus.l is subtracted from Db2 which is, by way of example, the original image density as represented by Db2−Dus.l in the parentheses of the second term, whereby the low spatial frequency component which the unsharp mask density Dus.l has is subtracted from Db2. Also, Db2−Dus.l is multiplied by the attenuation coefficient $\beta l$ satisfying the condition of $0 < \beta l$ wherein $\beta l \neq 1$ as represented by $\beta l(Db2-Dus.l)$, and $\beta l(Db2-Dus.l)$ is subtracted from Db1 which is, by way of example, the original image density. In this manner, the high spatial frequency component which Db2−Dus.l has can be attenuated from the density Db1. In the case where the high spatial frequency component is made to coincide with grainy noise of the image and the attenuation coefficient $\beta l$ is adjusted to be an appropriate value satisfying the condition of $0 < \beta l$ wherein $\beta l \neq 1$, grainy noise of the image can be attenuated, and deterioration of other image quality factors such as sharpness can be minimized. Also, the first X-ray image processing apparatus for carrying out the first X-ray image processing method is not complicated as compared with the conventional X-ray image processing apparatus, and can achieve the operation in a time within a substantially allowable range. Both the image densities Db1 and Db2 may be the original image density, or one or both of the image densities Db1 and Db2 may be the image density obtained by carrying out intermediate image processing of the signal representing the original image density.

The third and fourth terms of Formula (15) will now be described below. Grainy noise has a wide range of spatial frequency components. Therefore, in the case where grainy noise cannot be substantially restricted by the combination of the first term with the second term of Formula (15), the same operation as the second term is carried out in the third term or the fourth term by changing the spatial frequency region from the frequency region in the second term. Also, an attenuation coefficient $\beta m$ where $m \neq l$ may be adjusted so that $\beta m < 0$ in the third and fourth term and, for example, an operation for emphasizing specific spatial frequency components as proposed by the applicant in U.S. Pat. No. 4,317,179 may be used in combination.

Basic differences between the first X-ray image processing method in accordance with the present invention and the method as proposed by the applicant in, for example, U.S. Pat. No. 4,317,179 will now be described below. In the proposed method, an operation represented by a formula $$D' = Dorg + \beta(Dorg - Dus) \quad (16)$$

where Dus denotes an unsharp mask density, Dorg denotes a density of an original photograph, $\beta$ denotes an emphasis coefficient, and D' denotes a density reproduced on a copy photograph or the like, is carried out for emphasizing specific spatial frequency components.

The simplest formula of the first X-ray image processing method in accordance with the present invention comprises only the first term and the second term of Formula (15), i.e. is expressed as $$D' = Db1 - \beta l(Db2 - Dus.l) \quad (17)$$

As mentioned above, Formula (17) indicates that the spatial frequency components which grainy noise has are attenuated positively.

However, it was found by the inventors of U.S. Pat. No. 4,317,179 that the spatial frequency that grain noise has overlaps the spatial frequency affecting other image quality factors such as sharpness. Therefore, it is considered that in the case where the spatial frequency that grain noise has is attenuated positively, other image quality factors will deteriorate to an unrestorable extent. Accordingly, the image quality has heretofore been improved by emphasizing the spatial frequency components having a comparatively high degree of contribution to other image quality factors such as sharpness, instead of the graininess, without positively attenuating the spatial frequency components which grain noise has.

The inventors of the present invention studied the properties of grainy noise and found that grainy noise can be rendered imperceptible while deterioration of other image quality factors such as sharpness is being minimized by accurately selecting the spatial frequency which is to be attenuated and the extent of attenuation of said spatial frequency, and positively restricting the spatial frequency components which grainy noise has. The optimal value of the attenuation coefficient $\beta l$ employed for carrying out the attenuation is generally present in the range of $0 < \beta l < 1$, depending on the kind of the X-ray image or the like.

As mentioned above, with the first X-ray image processing method in accordance with the present invention, after the original image density at each scanning point is read out by scanning the original photograph carrying an X-ray image recorded thereon, at least a single attenuation coefficient $\beta l$ among the attenuation coefficients $\beta k$ where $k = 1, 2, \ldots, n$ is adjusted to be a constant within the range of $$0 < \beta l \text{ wherein } \beta l \neq 1,$$

and the operation represented by the formula $$D' = Db1 - \sum_{k=1}^{n} \beta k (Db2 - Dus.k)$$

is carried out. Therefore, the spatial frequency components above the spatial frequency component which the unsharp mask density Dus.l has can be attenuated, grainy noise of the X-ray image can be attenuated efficiently, and deterioration of other image quality factors can be minimized. Also, the apparatus for carrying out the first X-ray image processing method in accordance with the present invention is not so complicated and can achieve the operation in a time within a substantially allowable range.

The present invention also provides a second X-ray image processing method which comprises the steps of:

in the course of scanning an original photograph carrying an X-ray image recorded thereon, reading out an original image density at each scanning point on said original photograph, and reproducing said X-ray image as a visible image on a copy photograph or the like, i) obtaining a single unsharp mask by averaging original image densities within a predetermined range surrounding each scanning point or image densities obtained by carrying out intermediate processing of signals representing the original image densities, or obtaining a plurality of unsharp masks by changing said predetermined range, and denoting densities of said unsharp masks by Dus.k, where $k = 1, 2, \ldots, n$ wherein n denotes an integer representing the number of said unsharp masks, ii) denoting a single attenuation coefficient corresponding to single said unsharp mask or a plurality of attenuation coefficients corresponding to a plurality of said unsharp masks by $\beta k$ where $k = 1, 2, \ldots, n$, iii) adjusting at least a single attenuation coefficient $\beta l$, where l denotes an integer within the range of 1 to n, among said attenuation coefficients $\beta k$, where $k = 1, 2, \ldots, n$, to be a variable which is always within the range of $$0 \leq \beta l$$

and which varies in each said X-ray image, iv) carrying out an operation represented by a formula $$D' = Db1 - \sum_{k=1}^{n} \beta k (Db2 - Dus.k)$$

where Db1 and Db2 each denote said original image density or an image density obtained by carrying out intermediate processing of a signal representing said original image density, and D' denotes an image density obtained by the operation processing, by use of said attenuation coefficient $\beta l$, and v) attenuating spatial frequency components above the spatial frequency component which the density Dus.l of the unsharp mask corresponding to said attenuation coefficient $\beta l$ has.

The second X-ray image processing method in accordance with the present invention is carried out by a second X-ray image processing apparatus for processing a signal representing an original image density, which has been read out at each scanning point on an original photograph carrying an X-ray image recorded thereon by scanning said original photograph, by an operation device, and reproducing said X-ray image as a visible image on a copy photograph or the like by use of the signal representing the processed image density, wherein the improvement comprises constituting said operation device for:

i) obtaining a single unsharp mask by averaging original image densities within a predetermined range surrounding each scanning point or image densities obtained by carrying out intermediate processing of signals representing the original image densities, or obtaining a plurality of unsharp masks by changing said predetermined range, and denoting densities of said unsharp masks by Dus.k, where $k = 1, 2, \ldots, n$ wherein n denotes an integer representing the number of said unsharp masks, ii) denoting a single attenuation coefficient corresponding to single said unsharp mask or a plurality of attenuation coefficients corresponding to a plurality of said unsharp masks by $\beta k$ where $k = 1, 2, \ldots, n$, iii) adjusting at least a single attenuation coefficient $\beta l$, where l denotes an integer within the range of 1 to n, among said attenuation coefficients $\beta k$, where $k = 1, 2, \ldots, n$, to be a variable which is always within the range of $$0 \leq \beta l$$

and which varies in each said X-ray image, and iv) carrying out an operation represented by a formula $$D' = Db1 - \sum_{k=1}^{n} \beta k(Db2 - Dus.k)$$

where Db1 and Db2 each denote said original image density or an image density obtained by carrying out intermediate processing of a signal representing said original image density, and D' denotes an image density obtained by the operation processing, by use of said attenuation coefficient $\beta 1$.

With the second X-ray image processing method in accordance with the present invention, at least a single attenuation coefficient $\beta 1$ among the attenuation coefficients $\beta k$, where $k=1, 2, \ldots, n$, is adjusted to be a variable always having a value within the range of $$0 \leq \beta 1$$

and the operation represented by the formula $$D' = Db1 - \sum_{k=1}^{n} \beta k(Db2 - Dus.k) \quad (18)$$

is carried out.

Formula (18) can be rewritten into the form of $$\begin{aligned} D' &= Db1 - \beta l(Db2 - Dus.l) \\ &- \sum_{k=1}^{l-1} \beta k(Db2 - Dus.k) \\ &- \sum_{k=l+1}^{n} \beta k(Db2 - Dus.k) \end{aligned} \quad (19)$$

As for the second term $\beta l(Db2-Dus.l)$ of Formula (19), the unsharp mask density Dus.l is subtracted from Db2 which is, by way of example, the original image density as represented by Db2−Dus.l in the parentheses of the second term, whereby the low spatial frequency component which the unsharp mask density Dus.l has is subtracted from Db2. Also, Db2−Dus.l is multiplied by the attenuation coefficient $\beta l$ satisfying the condition of $0 \leq \beta l$ as represented by $\beta l(Db2-Dus.l)$, and $\beta l(Db2-Dus.l)$ is subtracted from Db1 which is, by way of example, the original image density. In this manner, in the region of $\beta l \neq 0$ (where $\beta l$ is the variable varying in the X-ray image) inside of the X-ray image, the high spatial frequency component which Db2−Dus.l has can be attenuated from the density Db1. In the case where the high spatial frequency component is made to coincide with grainy noise of the image and the attenuation coefficient $\beta l$ is adjusted to be an appropriate value as the variable varying within the range of $0 \leq \beta l$, grainy noise of the image can be attenuated, and deterioration of other image quality factors such as sharpness can be minimized in accordance with the condition of each region inside of a single image. Also, the second X-ray image processing apparatus for carrying out the second X-ray image processing method is not complicated as compared with the conventional X-ray image processing apparatus, and can achieve the operation in a time within a substantially allowable range. Both the image densities Db1 and Db2 may be the original image density, or one or both of the image densities Db1 and Db2 may be the image density obtained by carrying out intermediate image processing of the signal representing the original image density.

The third and fourth terms of Formula (19) will now be described below. Grainy noise has a wide range of spatial frequency components. Therefore, in the case where grainy noise cannot be substantially restricted by the combination of the first term with the second term of Formula (19) or finer image processing is to be carried out by changing the spatial frequency region for each region inside of a single image area, the same operation as the second term is carried out in the third term or the fourth term by changing the spatial frequency region from the frequency region in the second term. Also, an attenuation coefficient $\beta m$ where $m \neq 1$ may be adjusted so that $\beta m < 0$ in the third and fourth term and, for example, an operation for emphasizing specific spatial frequency components as proposed by the applicant in U.S. Pat. No. 4,317,179 may be used in combination.

The simplest formula of the second X-ray image processing method in accordance with the present invention comprises only the first term and the second term of Formula (19), i.e. is expressed as $$D' = Db1 - \beta l(Db2 - Dus.l) \quad (20)$$

As mentioned above, Formula (20) indicates that the spatial frequency components which grainy noise has are attenuated positively.

In the case where the attenuation coefficient $\beta l$ for carrying out the attenuation is varied within the range of $0 \leq \beta < 1$, it can optimize each region inside of the image for almost every image. As for the attenuation coefficient $\beta l$, various function forms may be selected in accordance with the purpose of image processing or the like. For example, the attenuation coefficient $\beta l$ may be adjusted to be a function of the image signals such that a portion of a low image density in the X-ray image where grainy noise is comparatively perceptible is blurred by increasing the extent of the attenuation, and the extent of the attenuation is decreased for a portion of a high image density where grainy noise is comparatively imperceptible to make the detailed structure sharper. Alternatively, the attenuation coefficient $\beta l$ may be varied in accordance with the object portion inside of a single image such as a bone portion, a lung portion or a heart portion in the X-ray image of the chest of the human body so that image processing is carried out to be suitable for each object portion.

As mentioned above, with the second X-ray image processing method in accordance with the present invention, after the original image density at each scanning point is read out by scanning the original photograph carrying an X-ray image recorded thereon, at least a single attenuation coefficient $\beta l$ among the attenuation coefficients $\beta k$ where $k=1, 2, \ldots, n$ is adjusted to be a variable which is always within the range of $$0 \leq \beta l$$

and which varies in each X-ray image, and the operation represented by the formula $$D' = Db1 - \sum_{k=1}^{n} \beta k(Db2 - Dus.k)$$

is carried out. Therefore, the spatial frequency components above the spatial frequency component which the unsharp mask density Dus.l has can be attenuated. Also, grainy noise of the X-ray image can be attenuated efficiently, and deterioration of other image quality factors can be minimized in accordance with each region inside of the X-ray image. Moreover, the apparatus for carrying out the second X-ray image processing method in accordance with the present invention is not so complicated and can achieve the operation in a time within a substantially allowable range.

The present invention further provides a third X-ray image processing method which comprises the steps of:

in the course of scanning an original photograph carrying an X-ray image recorded thereon and obtained by exposing a photographic film to X-rays, reading out an original image density at each scanning point on said original photograph, and reproducing said X-ray image as a visible image on a copy photograph or the like, i) obtaining an unsharp mask by averaging original image densities within a predetermined range surrounding each scanning point, and denoting a density of said unsharp mask by Dus, ii) denoting a coefficient corresponding to said unsharp mask by $\beta$, iii) adjusting said coefficient $\beta$ to be a function shifting from $\beta < 0$ to $\beta > 0$ as a dose of said X-rays irradiated to each point on said photographic film increases, iv) carrying out an operation represented by a formula $$D' = Dorg + \beta(Dorg - Dus) \quad (21)$$

where Dorg denotes said original image density, and D' denotes an image density obtained by the operation processing, by use of said coefficient $\beta$, and v) attenuating spatial frequency components above the spatial frequency component which said unsharp mask density Dus has in a region of a low X-ray dose inside of single said X-ray image, and emphasizing the spatial frequency components above the spatial frequency component which said unsharp mask density Dus has in a region of a high X-ray dose inside of single said X-ray image.

Other operations as well as the operation corresponding to Formula (21) may also be contained in the third X-ray image processing method in accordance with the present invention. Specifically, the present invention also provides a fourth X-ray image processing method which comprises the steps of:

in the course of scanning an original photograph carrying an X-ray image recorded thereon and obtained by exposing a photographic film to X-rays, reading out an original image density at each scanning point on said original photograph, and reproducing said X-ray image as a visible image on a copy photograph or the like, i) obtaining a single unsharp mask by averaging original image densities within a predetermined range surrounding each scanning point or image densities obtained by carrying out intermediate processing of signals representing the original image densities, or obtaining a plurality of unsharp masks by changing said predetermined range, and denoting densities of said unsharp masks by Dus.k, where $k = 1, 2, \ldots, n$ wherein n denotes an integer representing the number of said unsharp masks, ii) denoting a single coefficient corresponding to single said unsharp mask or a plurality of coefficients corresponding to a plurality of said unsharp masks by $\beta k$ where $k = 1, 2, \ldots, n$, iii) adjusting at least a single coefficient $\beta 1$, where 1 denotes an integer within the range of 1 to n, among said coefficients $\beta k$, where $k = 1, 2, \ldots, n$, to be a function shifting from $\beta 1 < 0$ to $\beta 1 > 0$ as a dose of said X-rays irradiated to each point on said photographic film increases, iv) carrying out an operation represented by a formula $$D' = Db1 + \sum_{k=1}^{n} \beta k(Db2 - Dus.k) \quad (22)$$

where Db1 and Db2 each denote said original image density or an image density obtained by carrying out intermediate processing of a signal representing said original image density, and D' denotes an image density obtained by the operation processing, by use of said coefficient $\beta 1$, and v) attenuating spatial frequency components above the spatial frequency component which the unsharp mask density Dus.l corresponding to said coefficient $\beta 1$ has in a region of a low X-ray dose inside of single said X-ray image, and emphasizing the spatial frequency components above the spatial frequency component which the unsharp mask density Dus.l corresponding to said coefficient $\beta 1$ has in a region of a high X-ray dose inside of single said X-ray image.

The third X-ray image processing method in accordance with the present invention is carried out by a third X-ray image processing apparatus for processing a signal representing an original image density, which has been read out at each scanning point on an original photograph carrying an X-ray image recorded thereon obtained by exposure of a photographic film to X-rays by scanning said original photograph, by an operation device, and reproducing said X-ray image as a visible image on a copy photograph or the like by use of the signal representing the processed image density, wherein the improvement comprises constituting said operation device for:

i) obtaining an unsharp mask by averaging original image densities within a predetermined range surrounding each scanning point, and denoting a density of said unsharp mask by Dus, ii) denoting a coefficient corresponding to said unsharp mask by $\beta$, iii) adjusting said coefficient $\beta$ to be a function shifting from $\beta < 0$ to $\beta > 0$ as a dose of said X-rays irradiated to each point on said photographic film increases, and iv) carrying out an operation represented by a formula $$D' = Dorg + \beta(Dorg - Dus) \quad (23)$$

where Dorg denotes said original image density, and D' denotes an image density obtained by the operation processing, by use of said coefficient $\beta$.

The third X-ray image processing apparatus for carrying out the third X-ray image processing method in accordance with the present invention may be provided with a function of carrying out other operations as well as the operation corresponding to Formula (23).

Specifically, the present invention further provides a fourth X-ray image processing apparatus for processing a signal representing an original image density, which has been read out at each scanning point on an original photograph carrying an X-ray image recorded thereon obtained by exposure of a photographic film to X-rays by scanning said original photograph, by an operation device, and reproducing said X-ray image as a visible image on a copy photograph or the like by use of the signal representing the processed image density, wherein the improvement comprises constituting said operation device for:

i) obtaining a single unsharp mask by averaging original image densities within a predetermined range surrounding each scanning point or image densities obtained by carrying out intermediate processing of signals representing the original image densities, or obtaining a plurality of unsharp masks by changing said predetermined range, and denoting densities of said unsharp masks by Dus.k, where k=1, 2, ..., n wherein n denotes an integer representing the number of said unsharp masks, ii) denoting a single coefficient corresponding to single said unsharp mask or a plurality of coefficients corresponding to a plurality of said unsharp masks by $\beta k$ where k=1, 2, ..., n, iii) adjusting at least a single coefficient $\beta l$, where l denotes an integer within the range of 1 to n, among said coefficients $\beta k$, where k=1, 2, ..., n, to be a function shifting from $\beta l < 0$ to $\beta l > 0$ as a dose of said X-rays irradiated to each point on said photographic film increases, and iv) carrying out an operation represented by a formula $$D' = Db1 + \sum_{k=1}^{n} \beta k(Db2 - Dus.k) \qquad (24)$$

where Db1 and Db2 each denote said original image density or an image density obtained by carrying out intermediate processing of a signal representing said original image density, and D' denotes an image density obtained by the operation processing, by use of said coefficient $\beta l$.

The term "shifting from $\beta < 0$ to $\beta > 0$" as used herein for the third X-ray image processing method and apparatus and the term "shifting from $\beta l < 0$ to $\beta l > 0$" as used herein for the fourth X-ray image processing method and apparatus embrace the case where, as shown in FIG. 11C by way of example, a region of $\beta = 0$ or $\beta l = 0$ is present at an intermediate region.

In the course of the operations expressed as Formulas (21) to (24), a signal (Dorg=k·E where k is a constant) proportional to the optical amount E of the light passing through the original photograph or the light reflected by the original photograph may be used as the signal representing the original image density Dorg, and the operations may be carried out by use of Dus, $\beta$, Dus.k, $\beta k$, Db1 and Db2 corresponding to said signal. Alternatively, from the viewpoint of signal amount compression or the like, the signal representing the original image density Dorg (Dorg=k'·log E where k' is a constant) proportional to a logarithmic value of the aforesaid optical amount E may be used, and the operations may be carried out by use of Dus, $\beta$, Dus.k, $\beta k$, Db1 and Db2 corresponding to said signal.

In general, both a region of a high X-ray dose and a region of a low X-ray dose are present in a single X-ray image in accordance with the distribution of various tissues constituting the object, a difference in thickness of the object, and the like. In the case where the signals representing the image densities obtained by the X-ray image read-out are uniformly subjected to an operation for emphasizing the contrast, the sharpness and the like by use of the method disclosed in, for example, U.S. Pat. No. 4,317,179, grain noise is emphasized and the image becomes rough in the region of a low X-ray dose including more grain noise even though the image quality is improved in the region of a high X-ray dose originally including less grain noise. On the other hand, in the case where grain noise is positively reduced by use of the aforesaid second X-ray image processing method in accordance with the present invention in order to restrict grain noise in the region of a low X-ray dose, the sharpness and the contrast are deteriorated slightly in the region of a high X-ray dose. With both of these methods, it is necessary for image processing to be carried out by ascertaining the balance among the image quality factors of the overall image.

In the third X-ray image processing method in accordance with the present invention, by considering that both the region of a high X-ray dose and the region of a low X-ray dose are present in a single X-ray image, the coefficient $\beta$ is shifted from $\beta < 0$ to $\beta > 0$ as the X-ray dose increases in the course of carrying out image processing represented by Formula (21).

In this manner, grain noise can be reduced positively in the region of a low X-ray dose including more grain noise in the X-ray image, and the image quality factors such as the sharpness and the contrast can be improved positively in the region of a high X-ray dose originally including less grain noise in the X-ray image. Therefore, the image quality of a reproduced visible image can be improved markedly over the case where image processing is carried out uniformly for the overall image.

The X-ray dose in each region of the X-ray image can be detected by investigating the signal representing the original image density obtained by scanning and reading out the original photograph.

Also, in order to carry out image processing suitable for each region of the X-ray image as mentioned above, the method as disclosed in U.S. Pat. No. 4,317,179 and the second X-ray image processing method in accordance with the present invention may be combined with each other, and an operation may be carried out as represented by a formula $$D' = Dorg - \beta'(Dorg - Dus') + \beta''(Dorg - Dus'') \qquad (25)$$

where Dorg denotes the original image density, Dus' and Dus" denote densities of two unsharp masks subjected to appropriate frequency response processing, $\beta'$ and $\beta''$ ($\beta'$, $\beta'' > 0$) denote coefficients each having an appropriate function form as the function of the original image density (the function of the X-ray dose), and D' denotes the image density obtained by processing. However, with this method, both the operation of the second term $\beta'(Dorg-Dus')$ and the operation of the third term $\beta''(Dorg-Dus'')$ must at least be carried out for each scanning point on the X-ray image.

On the other hand, in the case where Formula (21) which is the most basic formula in the third X-ray image processing method in accordance with the present invention is used, only a single term of $\beta(Dorg-Dus)$ may be calculated, and the operation can be completed in a time approximately half the operation time of Formula (25). Also, in the case where the apparatus is constituted to carry out the operation by hardware, the apparatus configuration is simplified markedly.

As indicated by Formula (22), the fourth X-ray image processing method in accordance with the present invention includes other operations as well as the operation represented by Formula (21). Formula (22) can be rewritten into the form of $$D' = Db1 + \beta l(Db2 - Dus.l) \quad (26)$$
$$+ \sum_{k=1}^{l-1} \beta k(Db2 - Dus.k)$$
$$+ \sum_{k=l+1}^{n} \beta k(Db2 - Dus.k)$$

When the first term Db1 and Db2 of the second term in Formula (26) are expressed as the original image density Dorg, the combination $Db1+\beta l(Db2-Dus.l)$ of the first term with the second term becomes identical with Formula (21). Specifically, for a single X-ray image, various kinds of image processing such as various kinds of noise reducing processing and window processing for taking up only the necessary spatial frequency components are often carried out as well as the processing in accordance with the present invention. Therefore, in the course of using the fourth X-ray image processing method in accordance with the present invention, the original image density Dorg obtained by reading out the X-ray image need not necessarily be used directly, and an image density obtained by subjecting the signal representing the original image density Dorg to intermediate processing, for example, of the type as mentioned above may be used. Also, in this case, nearly the same effects as Formula (21) can be obtained, and the operation can be combined efficiently with other operation processing. The image density obtained by intermediate processing may also be the image density generated in the course of carrying out the fourth X-ray image processing method in accordance with the present invention.

The third and fourth terms of Formula (26) will now be described below. Spatial frequency components of grainy noise and spatial frequency components carrying the image quality factors such as the sharpness and the contrast are present over wide ranges. Therefore, in the case where image processing is to be carried out more finely than image processing using the combination of the first term with the second term of Formula (26), the same operation as the second term is carried out in the third term or the fourth term by changing the spatial frequency region from the frequency region in the second term.

Also, a coefficient $\beta m$ where $m \neq 1$ may be adjusted so that $\beta m > 0$ in the third and fourth terms and, for example, an operation for emphasizing specific spatial frequency components as proposed by the applicant in U.S. Pat. No. 4,317,179 may be carried out over the overall image in order to compensate the operation of the first and second terms. Also, a coefficient $\beta n$ where $n \neq 1$ may be adjusted so that $\beta n < 0$, and the operation for reducing grain noise in accordance with the second X-ray image processing method of the present invention may be carried out over the overall image.

As mentioned above, the operation time of the operation of the first and second terms of Formula (26), i.e. the operation corresponding to the operation represented by Formula (21), is markedly shortened as compared with the operation represented by Formula (25) or the like. Therefore, finer image processing can be achieved by carrying out the operation of the third and fourth terms as mentioned above by the utilization of the margin time.

With the third and fourth X-ray image processing apparatuses in accordance with the present invention wherein the operation device is provided with the function of the aforesaid operation processing, the software execution time can be shortened in the case where the function is achieved by the software, or the apparatus configuration can be simplified in the case where the function is achieved by the hardware.

As mentioned above, with the third X-ray image processing method in accordance with the present invention, after the original image density at each scanning point is read out by scanning the original photograph carrying an X-ray image recorded thereon obtained by exposure of the photographic film to X-rays, the operation represented by the formula $$D' = Dorg + \beta(Dorg - Dus) \quad (21)$$

is carried out by using the coefficient $\beta$ shifting from $\beta < 0$ to $\beta > 0$ as the dose of X-rays irradiated to each point on the photographic film increases. Therefore, grain noise can be reduced in the region of a low X-ray dose including more grain noise in the X-ray image, and the image quality factors such as the sharpness and the contrast can be improved positively in the region of a high X-ray dose originally including less grain noise in the X-ray image. As a result, the image quality of the overall image can be improved.

Also, as the operation represented by Formula (21) can be completed in a short operation time, finer image processing can be carried out as represented by Formula (22)

$$D' = Db1 + \sum_{k=1}^{n} \beta k(Db2 - Dus.k) \quad (22)$$

by the utilization of the margin time in accordance with the fourth X-ray image processing method of the present invention.

Furthermore, the apparatuses for carrying out the third and fourth X-ray image processing methods in accordance with the present invention are not so complicated and can achieve the operation in a time within a substantially allowable range.

BRIEF DESCRIPTION OF THE DRAWINGS

FIGS. 3A, 3B and 3C are block diagrams showing examples of the configuration of the operation device shown in FIG. 2, FIGS. 6A, 6B and 6C are block diagrams showing examples of the configurations of the operation devices in the radiation image processing apparatuses for carrying out the third and fourth radiation image processing methods in accordance with the present invention, FIG. 8 is a perspective view showing an embodiment of the X-ray image processing apparatus for carrying out the first X-ray image processing method in accordance with the present invention, FIGS. 9A, 9B and 9C are block diagrams showing examples of the configuration of the operation device shown in FIG. 8, FIGS. 12A, 12B and 12C are block diagrams showing examples of the configurations of the operation devices in the X-ray image processing apparatuses for carrying out the third and fourth X-ray image processing methods in accordance with the present invention.

DESCRIPTION OF THE PREFERRED EMBODIMENTS

The present invention will hereinbelow be described in further detail with reference to the accompanying drawings.

Figure 2:
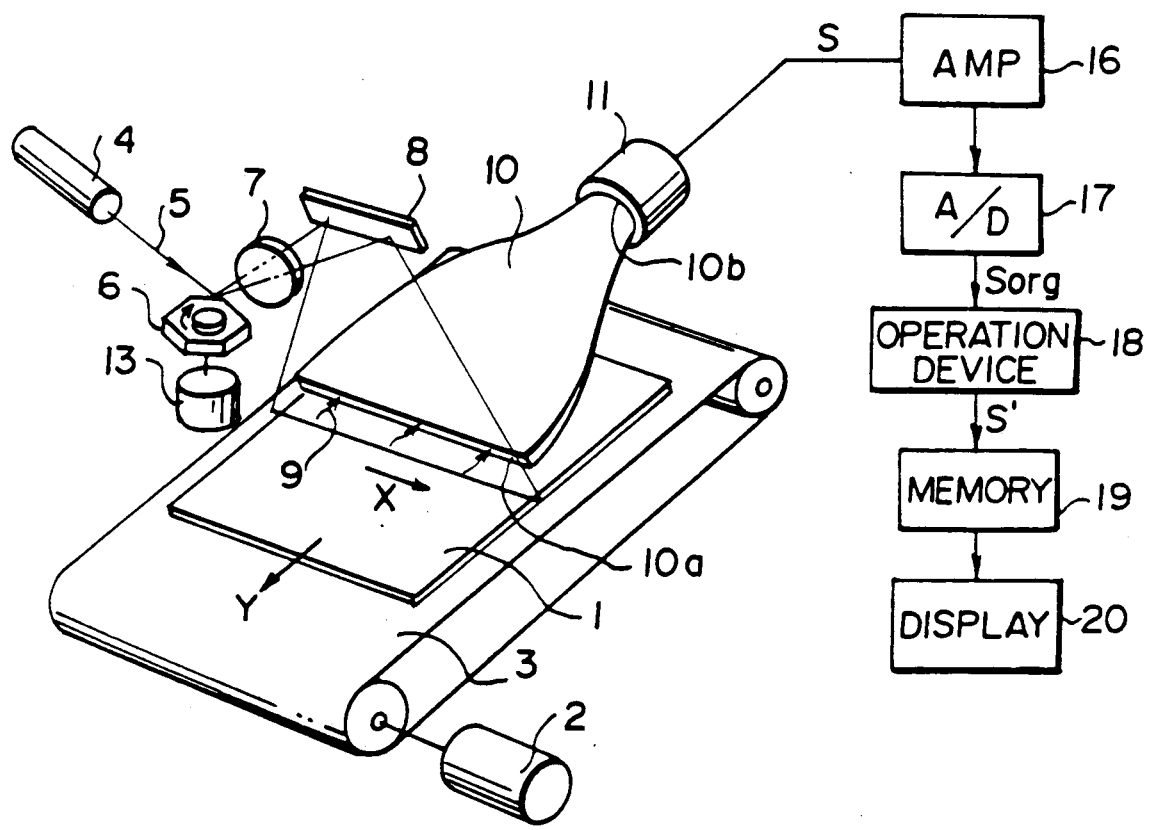
FIG. 2 is a perspective view showing an embodiment of the radiation image processing apparatus for carrying out the first radiation image processing method in accordance with the present invention.

With reference to FIG. 2, a stimulable phosphor sheet 1 carrying a radiation image of an object stored thereon is conveyed in a sub-scanning direction as indicated by the arrow Y by a sheet conveyance means 3 constituted by an endless belt or the like operated by a motor 2. On the other hand, stimulating rays 5 produced by a laser beam source 4 are reflected and deflected by a rotating polygon mirror 6 quickly rotated by a motor 13 in the direction as indicated by the arrow, and pass through a converging lens 7 constituted by a f$\theta$ lens or the like. The optical path of the stimulating rays 5 is then changed by a mirror 8, and the stimulating rays 5 impinge upon the stimulable phosphor sheet 1 and scan it in a main scanning direction as indicated by the arrow X approximately normal to the subscanning direction as indicated by the arrow Y. As the stimulable phosphor sheet 1 is exposed to the stimulating rays 5, the exposed portion of the stimulable phosphor sheet 1 emits light 9 in an optical amount proportional to the stored radiation energy. The emitted light 9 is guided by a light guide member 10, and photoelectrically detected by a photomultiplier 11 as a photodetector. The light guide member 10 is made by the forming of a light guiding material such as an acrylic plate, and has a linear light input face 10a positioned to extend along the main scanning line on the stimulable phosphor sheet 1, and a ring-shaped light output face 10b closely contacted with a light receiving face of the photomultiplier 11. The emitted light 9 entering the light guide member 10 from its light input face 10a is guided through total reflection inside of the light guide member 10, emanates from the light output face 10b, and is received by the photomultiplier 11. In this manner, the amount of the emitted light 9 carrying the radiation image is detected by the photomultiplier 11.

An analog output signal S generated by the photomultiplier 11 is amplified by an amplifier 16, and digitized by an A/D converter 17 with a predetermined scale factor into an original image signal Sorg.

The digital original image signal Sorg thus obtained is fed to an operation device 18. The operation device 18 calculates unsharp mask signals by averaging the image signals within a predetermined range surrounding each scanning point. The unsharp mask signals thus calculated are denoted by Sus.k, where k=1, 2, ..., n wherein n denotes an integer representing the number of the unsharp mask signals calculated by changing said predetermined range. The operation device 18 then calculates an image signal S' by carrying out operation processing as represented by $$S' = Sb1 - \sum_{k=1}^{n} \beta k (Sb2 - Sus.k) \quad (27)$$

by use of Sb1 and Sb2 each denoting the original image signal Sorg fed to the operation device 18 or a signal obtained by carrying out intermediate processing of the original image signal Sorg, and attenuation coefficients $\beta k$, where k=1, 2, ..., n, prepared in advance to correspond to the unsharp mask signals Sus.k, where k=1, 2, ..., n. The simplest operation processing among the operation processing represented by Formula (27) is expressed as $$S' = Sb1 - \beta l(Sb2 - Sus.l) \quad (28)$$

wherein a single unsharp mask signal Sus.l and an attenuation coefficient $\beta 1$ where $0 < \beta 1$, $\beta 1 \neq 1$ are used. Operation processing represented by Formula (28) indicates that spatial frequency components above the spatial frequency component which the unsharp mask signal Sus.l has are attenuated positively. Image graininess can be improved apparently and deterioration of other image quality factors such as sharpness can be minimized by accurately selecting the spatial frequency components which are to be attenuated and the extent of attenuation of the spatial frequency components.

The image signal S' obtained by carrying out operation processing in the operation device 18 is stored in a memory 19, and used for reproducing and displaying the radiation image on an image display device 20.

FIGS. 3A, 3B and 3C show different configurations of the operation device 18 shown in FIG. 2.

With reference to FIG. 3A, the original image signal Sorg is fed to a storage means 21 from the left side and stored therein. The original image signal Sorg stored in the storage means 21 is directly fed to a subtraction means 24 as will be described later, and fed in parallel to n number of unsharp mask signal calculating means 22a, 22b, ..., 22n including the first unsharp mask signal calculating means 22a. The unsharp mask signal calculating means 22a, 22b, ..., 22n calculate unsharp mask signals Sus.1, Sus.2, ..., Sus.n respectively by averaging the image signals at N1×N1 number of scanning points N2×N2 number of scanning points, ..., Nn×Nn number of scanning points around each scanning point. The unsharp mask signals Sus.1, Sus.2, ..., Sus.n are respectively fed to n number of attenuation term calculating means 23a, 23b, ..., 23n including the first attenuation term calculating means 23a, which calculate attenuation terms $\beta 1(Sorg - Sus.1)$, $\beta 2(Sorg - Sus.2)$, ..., $\beta n(Sorg - Sus.n)$ respectively. These attenuation terms and the original image signal Sorg are fed to the subtraction means 24 which calculates as represented by a formula $$S' = Sorg - \sum_{k=1}^{n} \beta k(Sorg - Sus.k) \quad (29)$$

to obtain the operation-processed image signal S'.

FIG. 3B shows an example of the configuration of the operation device 18 different from the configuration shown in FIG. 3A. In FIG. 3B, similar elements are numbered with the same reference numerals with respect to FIG. 3A.

With reference to FIG. 3B, an unsharp mask signal calculating means 22' calculates a mean value of the signals at 3×3 scanning points around each scanning point, and then calculates a mean value of the mean values thus obtained. In this manner, the unsharp mask signal calculating means 22' calculates mean values of the signals at 9×9 scanning points, 15×15 scanning points and so on, thereby to obtain the unsharp mask signals corresponding to the attenuation term calculating means 23a, 23b, ..., 23n, and sends the unsharp mask signals to the attenuation term calculating means 23a, 23b, ..., 23n. With this configuration, the unsharp mask signals can be calculated efficiently.

FIG. 3C shows a further example of the configuration of the operation device 18 shown in FIG. 2.

With reference to FIG. 3C, the original image signal Sorg is temporarily stored in a storage means 21" and then sent to an unsharp mask signal calculating means 22". The unsharp mask signal calculating means 22" calculates the unsharp mask signal Sus.1 corresponding to the attenuation coefficient $\beta 1$ on the basis of the original image signal Sorg. The unsharp mask signal Sus.1 is sent to an attenuation term calculating means 23" which calculates $\beta 1(Sorg-Sus.1)$ and sends the calculated value to a subtraction means 24". In the subtraction means 24", an image signal $S1 = Sorg - \beta 1 (Sorg - Sus.1)$ obtained by intermediate processing of the original image signal Sorg is calculated.

The image signal S1 thus obtained is fed back to the storage means 21" and stored instead of the original image signal Sorg which has been stored in the storage means 21". The image signal S1 is sent to the unsharp mask signal calculating means 22", and the unsharp mask signal Sus.2 corresponding to the attenuation coefficient $\beta 2$ is then calculated on the basis of the image signal S1. The unsharp mask signal Sus.2 is sent to the attenuation term calculating means 23" which calculates as represented by $\beta 2(S1-Sus.2)$. The result of the calculation is sent to the subtraction means 24", and an image signal $S2 = S1 - \beta 2(S1 - Sus.2)$ obtained by second intermediate processing of the image signal S1 is calculated.

The aforesaid loop is repeated n times to calculate an ultimately operation-processed signal S' expressed as $$S' = Sn - 1 - \beta n(Sn - 1 - Sus.n) \quad (30)$$

Grainy noise can be attenuated efficiently while deterioration of image quality factors such as the sharpness is being minimized also by calculating the unsharp mask signals Sus.1, Sus.2, ..., Sus.n by use of the intermediate processed image signals S1, S2, ..., Sn-1 and calculating as represented by Formula (30) in the manner as mentioned above.

When Formula (30) is compared with Formula (27), the same image signal Sn-1 is used as the image signals Sb1 and Sb2 in Formula (27). However, the image signals Sb1 and Sb2 may be different from each other. For example, in FIG. 3C, the original image signal Sorg may be directly fed also to the attenuation term calculating means 23" and stored therein, and calculations expressed as $\beta 1(Sorg-Sus.1)$ $\beta 2(Sorg-Sus.2)$ may be carried out in the attenuation term calculating means 23" by use of the original image signal Sorg alone, instead of using the image signals S1, S2, ..., Sn-1 obtained by intermediate processing. In this manner, the signal S' may ultimately be calculated as expressed by a formula $$S' = Sn - 1 - \beta n(Sorg - Sus.n) \quad (31)$$

Figure 1:
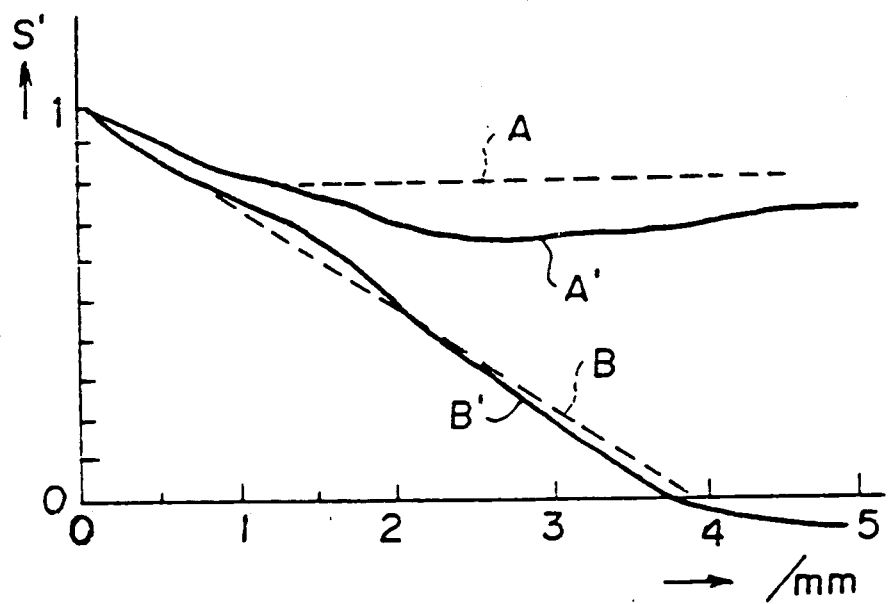
FIG. 1 is a graph showing examples of image signals calculated by using the first radiation image processing method in accordance with the present invention in terms of a spatial frequency region.

FIG. 1 shows examples of the results of calculations in the case where n=2 (i.e. the number of the unsharp mask signals is two, and the number of the attenuation coefficients is two) by use of the first radiation image processing method in accordance with the present invention. The results of calculations are shown with respect to the spatial frequency region. In FIG. 1, the horizontal axis indicates the spatial frequency, and the vertical axis indicates the values relative to the direct current component taken as 1. For simplicity of explanation, signals obtained by Fourier transformation of the operation-processed image signals S' and indicated in terms of the spatial frequency region are expressed also as S'.

The graph A is an ideal one indicating the spatial frequency characteristics suitable for restricting grainy noise of a radiation image and minimizing deterioration of other image quality factors such as the sharpness. The graph A' indicates the results of the calculation represented by a formula $$S' = Sorg - \beta 1(Sorg - Sus.1) \beta 2(Sorg - Sus.2) \quad (32)$$

carried out by using a mean value of signals at 15×15 scanning points around each scanning point and a mean value of signals at 5×5 scanning points around each scanning point as the unsharp mask signals Sus.1 and Sus.2 respectively, and using $\beta 1 = 0.1$ and $\beta 2 = 0.4$ as the attenuation coefficients $\beta 1$ and $\beta 2$. The results of the calculation are indicated in terms of the spatial frequency region. The graph A' is substantially approximate to the graph A.

The graph B is an ideal one indicating the spatial frequency characteristics suitable for another radiation image. The graph B' indicates the results of the calculation represented by a formula $$S' = Sorg - \beta 1(Sorg - Sus.1) \beta 2(Sorg - Sus.2) \quad (33)$$

carried out by using a mean value of signals at 15×15 scanning points around each scanning point and a mean value of signals at 3×3 scanning points around each scanning point as the unsharp mask signals Sus.1 and Sus.2 respectively, and using $\beta 1 = 0.1$ and $\beta 2 = 0.8$ as the attenuation coefficients $\beta 1$ and $\beta 2$. The results of the calculation are indicated in terms of the spatial frequency region. Also, in this case, the graph B' is substantially approximate to the graph B.

As mentioned above, in the case where the radiation images are classified in accordance with the kind of the object, the intensity of radiation irradiated to the object, and the like, and operation processing is carried out in accordance with the aforesaid method by selecting the method of calculation of the unsharp mask signal and selecting the value of the attenuation coefficient to be suitable for each radiation image, a reproduced visible image wherein grainy noise of the radiation image is attenuated efficiently and deterioration of other image quality factors such as the sharpness is minimized can be obtained.

An embodiment of the second radiation image processing method in accordance with the present invention will be described hereinbelow.

In this embodiment, in the apparatus having the configuration as shown in FIG. 2, the digital original image signal Sorg obtained by the A/D converter 17 in the same manner as mentioned above is fed to the operation device 18. The operation device 18 calculates unsharp mask signals by averaging the image signals within a predetermined range surrounding each scanning point. The unsharp mask signals thus calculated are denoted by Sus.k, where k=1, 2, ..., n wherein n denotes an integer representing the number of the unsharp mask signals calculated by changing said predetermined range. The operation device 18 then calculates an image signal S' by carrying out operation processing as represented by $$S' = Sb1 - \sum_{k=1}^{n} \beta k(Sb2 - Sus.k) \quad (34)$$

by use of Sb1 and Sb2 each denoting the original image signal Sorg fed to the operation device 18 or a signal obtained by carrying out intermediate processing of the original image signal Sorg, and attenuation coefficients $\beta k$, where k=1, 2, ..., n, prepared in advance as, for example, a function of the original image signal Sorg to correspond to the unsharp mask signals Sus.k, where k=1, 2, ..., n.

The simplest operation processing among the operation processing represented by Formula (34) is expressed as $$S' = Sb1 - \beta l(Sb2 - Sus.l) \quad (35)$$

wherein a single unsharp mask signal Sus.l and an attenuation coefficient $\beta l$ where 0 $\beta l$ are used. Operation processing represented by Formula (35) indicates that spatial frequency components above the spatial frequency component which the unsharp mask signal Sus.l has are attenuated positively. Image graininess can be improved apparently and deterioration of other image quality factors such as sharpness can be minimized by accurately selecting the spatial frequency components which are to be attenuated and the extent of attenuation of the spatial frequency components.

The image signal S' obtained by carrying out operation processing in the operation device 18 is stored in the memory 19, and used for reproducing and displaying the radiation image on the image display device 20.

In this embodiment, the operation device 18 may be constituted in the same manner as shown in FIGS. 3A, 3B and 3C.

As shown in FIG. 1, the optimal values of the attenuation coefficients $\beta k$ where k=1, 2, ..., n are first determined by the kind of the radiation image.

Figure 4:
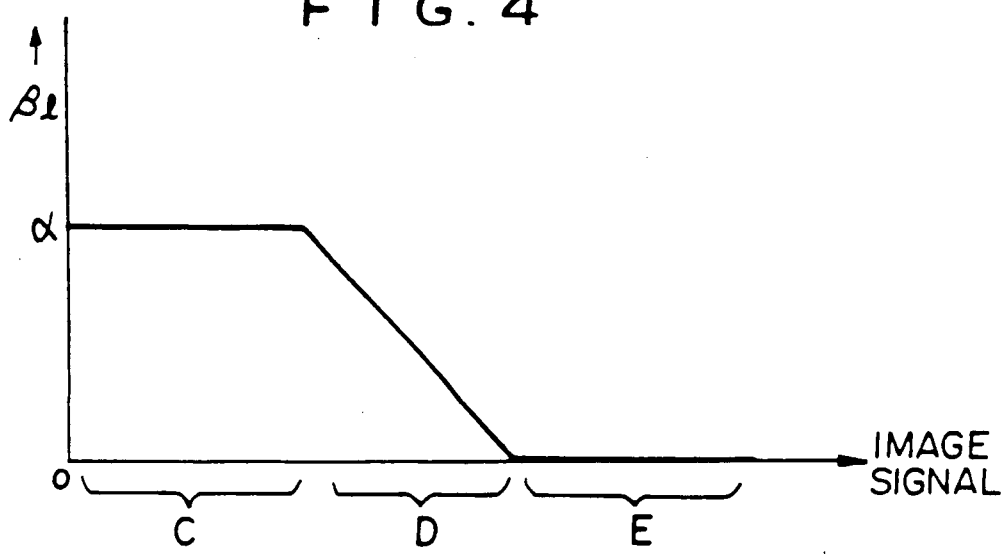
FIG. 4 is a graph showing an example of the function of the attenuation coefficient $\beta 1$ with the image signal being a variable in the second radiation image processing method in accordance with the present invention.

FIG. 4 is a graph showing an example of the function of the attenuation coefficient $\beta l$ with the image signal being the variable. The graph indicates that the image is blurred by adjusting the attenuation coefficient $\beta l = \alpha$ in a region C where the image density is low and grainy noise is comparatively perceptible, the image blurring is avoided by adjusting so that $\beta l = 0$ and the detailed image structure becomes sharp in a region E where the image density is high and grainy noise is comparatively imperceptible, and $\beta l$ is decreased as the image density increases in an intermediate region D. In the case where the attenuation coefficients $\beta k$ where k=1, 2, ..., n are changed in accordance with the image signals in a single radiation image as shown in FIG. 4, finer image processing can be carried out as compared with the case where $\beta k$ wherein k=1, 2, ..., n having the same values are used over the overall radiation image.

The graph shown in FIG. 4 is a mere example, and a suitable function form of the attenuation coefficient $\beta l$ is selected in accordance with the kind of the radiation image, the purpose of image processing and the like. For example, the attenuation coefficient $\beta l$ may vary in a curve form with respect to the image signal.

Also, in the case where the attenuation coefficients $\beta k$ where k=1, 2, ..., n are changed for each object in a single image as mentioned above, instead of adjusting $\beta k$ as a function of the image signals, finer image processing can be carried out as in the case where $\beta k$ are adjusted as a function of the image signals.

As mentioned above, in the case where the radiation images are classified in accordance with the kind of the object in the overall image (for example, the chest, the head or the like of the human body), the intensity of radiation irradiated to the object, and the like, and operation processing is carried out in accordance with the aforesaid method by selecting the method of calculation of the unsharp mask signal and selecting the value of the attenuation coefficient to be suitable for each radiation image, a reproduced visible image wherein grainy noise of the radiation image is attenuated efficiently in accordance with each region in the image and deterioration of other image quality factors such as the sharpness is minimized can be obtained.

An embodiment of the third radiation image processing method in accordance with the present invention will be described hereinbelow.

In this embodiment, in the apparatus having the configuration as shown in FIG. 2, the digital original image signal Sorg obtained by the A/D converter 17 in the same manner as mentioned above is fed to the operation device 18. The original image signal Sorg is proportional to the dose of radiation irradiated to the stimulable phosphor sheet 1. The operation device 18 calculates an unsharp mask signal Sus by averaging the image signals within a predetermined range surrounding each scanning point. The operation device 18 then calculates an image signal S' by carrying out operation processing as represented by $$S' = Sorg + \beta(Sorg - Sus) \quad (36)$$

by use of a coefficient $\beta$ prepared in advance to correspond to the unsharp mask signal Sus. The coefficient $\beta$ is adjusted as a function of the original image signal Sorg so that $\beta < 0$ when the level of the original image signal Sorg is low and $\beta > 0$ when the level of the original image signal Sorg is high.

With this operation processing wherein $\beta < 0$ in a region of a low radiation dose and more grain noise in the radiation image, spatial frequency components above the spatial frequency component which the unsharp mask signal Sus has are attenuated in said region. Therefore, in said region, grain noise of the image is restricted and deterioration of other image quality factors such as the sharpness is minimized by appropriately selecting the spatial frequency components which are to be attenuated and the extent of the attenuation. Also, $\beta > 0$ in a region of a high radiation dose and less grain noise. Therefore, in this region, spatial frequency components above the spatial frequency component which the unsharp mask signal Sus has are emphasized, and the image quality factors such as the sharpness are improved positively.

Also, as the fourth radiation image processing method in accordance with the present invention, the operation device 18 may be constituted for:

i) obtaining a single unsharp mask signal Sus.k by averaging original image signals within a predetermined range surrounding each scanning point or image signals obtained by carrying out intermediate processing of the original image signals, or obtaining a plurality of unsharp mask signals Sus.k, where $k = 1, 2, \ldots, n$ wherein n denotes an integer representing the number of the unsharp mask signals, by changing said predetermined range, ii) denoting a single coefficient corresponding to the single unsharp mask signal or a plurality of coefficients corresponding to a plurality of the unsharp mask signals by $\beta k$ where $k = 1, 2, \ldots, n$, iii) adjusting at least a single coefficient $\beta l$, where l denotes an integer within the range of 1 to n, among the coefficients $\beta k$, where $k = 1, 2, \ldots, n$, to be a function shifting from $\beta l < 0$ to $\beta l > 0$ as a dose of radiation irradiated to each point on the stimulable phosphor increases, and iv) carrying out an operation represented by a formula $$S' = Sb1 + \sum_{k=1}^{n} \beta k (Sb2 - Sus.k) \quad (37)$$

where Sb1 and Sb2 each denote the original image signal or an image signal obtained by carrying out intermediate processing of the original image signal, and S' denotes an image signal obtained by the operation processing, by use of the coefficient $\beta l$.

The image signal S' thus obtained by carrying out operation processing in the operation device 18 is stored in the memory 19, and used for reproducing and displaying the radiation image on the image display device 20.

Figure 5A:
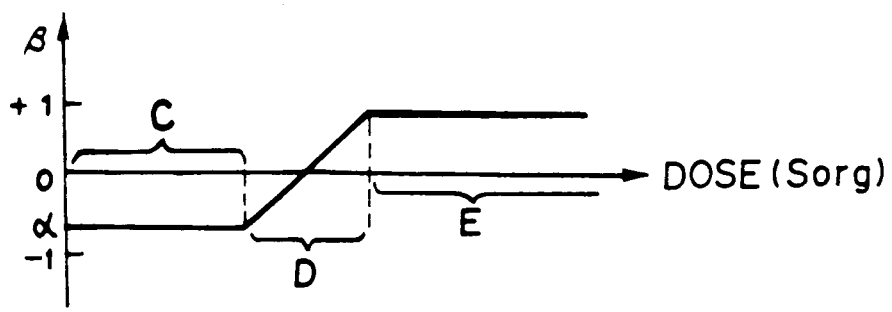
FIGS. 5A, 5B and 5C are graphs showing examples of the function forms of the coefficient $\beta$ in the third and fourth radiation image processing methods in accordance with the present invention.
Figure 5B:
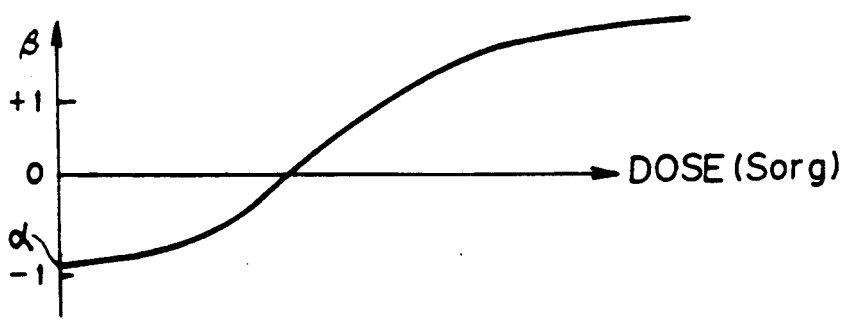
Figure 5C:
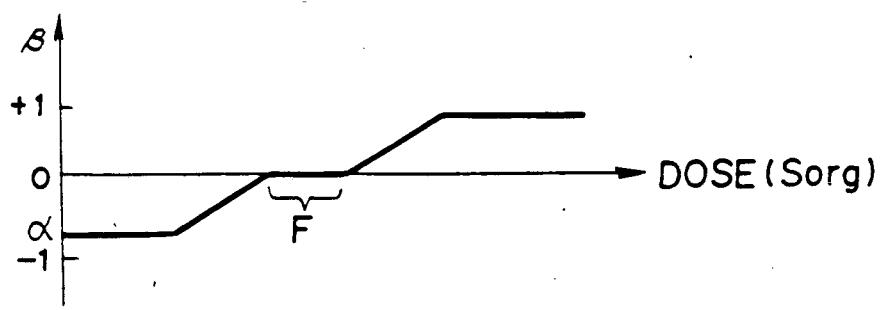

FIGS. 5A, 5B and 5C are graphs showing examples of the functions of the coefficient $\beta$ wherein the dose of radiation irradiated to the stimulable phosphor sheet 1 shown in FIG. 2 is employed as a variable. As mentioned above, the original image signal Sorg is read out to be proportional to the radiation dose. Therefore, the radiation dose plotted on the horizontal axis may be replaced by the original image signal Sorg. Actually, from the viewpoint of signal amount compression, the logarithmic value of the optical amount E of the light emitted by the stimulable phosphor sheet 1 is often used as the original image signal Sorg ($Sorg = k' \cdot \log E$ where k' is a constant). Also, in this case, the (positive) correlation wherein the level of the original image signal Sorg becomes higher as the radiation dose increases do not change.

FIG. 5A shows that the coefficient $\beta$ is adjusted to be $\beta = \alpha$ ($<0$) for restricting grain noise in a region C wherein the level of the image signal is low and grain noise is perceptible, the coefficient $\beta$ is adjusted to be $\beta > 0$ for positively improving the image quality factors such as the contrast and the sharpness and reproducing detailed structures sharply in a region E wherein the level of the image signal is high and grain noise is comparatively imperceptible, and the coefficient $\beta$ is increased as the level of the image signal becomes higher in an intermediate region D.

FIG. 5B shows the example wherein the coefficient $\beta$ is increased monotonously as the level off the image signal becomes higher.

FIG. 5C shows the example wherein the coefficient $\beta$ is adjusted to be $\beta = 0$ in an intermediate region F where the image quality factors are well balanced.

The graphs shown in FIGS. 5A, 5B and 5C are mere examples, and the function form may be selected appropriately from various forms in accordance with the kind of the object or the like insofar as $\beta < 0$ in the region where the level of the image signal is low (the radiation dose is low) and $\beta > 0$ in the region where the level of the image signal is high (the radiation dose is high). Also, experiments carried out by the inventors revealed that, though the function form of $\beta$ differs in accordance with the kind of the object or the like, the coefficient $\beta$ need not generally be adjusted so that $\beta \leq -1$, and substantially appropriate image processing can be achieved in the range of $-1 < \beta$.

FIGS. 6A, 6B and 6C show examples of the configurations of the operation device 18 shown in FIG. 2 for carrying out the third and fourth radiation image processing methods in accordance with the present invention.

With reference to FIG. 6A, the original image signal Sorg is fed to a storage means 121 from the left side and stored therein. The original image signal Sorg stored in the storage means 121 is fed to an unsharp mask signal calculating means 12, a coefficient generating means 123, an addition term calculating means 124, and an addition means 125.

The unsharp mask signal calculating means 122 calculates the unsharp mask signal Sus by averaging the image signals at $N \times N$ scanning points around each scanning point on the basis of the original image signal Sorg. The unsharp mask signal Sus thus calculated is fed to the addition term calculating means 124 as will be described later.

The coefficient generating means 123 stores a table specifying the correspondence between the original image signal Sorg and the coefficient $\beta$. The coefficient generating means 123 generates the coefficient $\beta$ corresponding to each scanning point in accordance with the value of the fed original image signal Sorg at each scanning point, and feeds the coefficient $\beta$ to the addition term calculating means 124.

The addition term calculating means 124 calculates $\beta(Sorg - Sus)$ for each scanning point on the basis of the fed original image signal Sorg, the unsharp mask signal Sus and the coefficient $\beta$, and feeds out the calculated value.

The result of the calculation expressed as $\beta(Sorg-Sus)$ is fed to the addition means 125, and the addition means 125 calculates the image signal S' by carrying out operation processing expressed as $$S\alpha = Sorg + \beta(Sorg - Sus) \tag{38}$$

FIG. 6B shows another example of the configuration of the operation device 18 shown in FIG. 2.

With reference to FIG. 6B, the original image signal Sorg is fed to a storage means 121' from the left side and stored therein. The original image signal Sorg stored in the storage means 121' is fed to n number of unsharp mask signal calculating means 122a', 122b', ..., 122n', n number of coefficient generating means 123a', 123b', ..., 123n', n number of addition term calculating means 124a', 124b', ..., 124n', an dan addition means 125'.

Then, n number of the unsharp mask signal calculating means 122a', 122b', ..., 122n' including the first unsharp mask signal calculating means 122a' calculate unsharp mask signals Sus.1, Sus.2, ..., Sus. n respectively by averaging the image signals at N1×N1 number of scanning points N2×N2 number of scanning points, ..., Nn×Nn number of scanning points around each scanning point. The unsharp mask signals Sus.1, Sus.2, ..., Sus.n are respectively fed to n number of the addition term calculating means 124a', 124b', ..., 124n' including the first addition term calculating means 124a'.

Also, n number of the coefficient generating means 123a', 123b', ..., 123n' including the first coefficient generating means 123a' store tables specifying the correspondence between the original image signal Sorg and the coefficients $\beta1, \beta2, \ldots \beta n$, corresponding to n number of the unsharp mask signals Sus.1, Sus.2, ..., Sus.n. The coefficient generating means 123a', 13b', ..., 123n' generate the coefficients $\beta1, \beta2, \ldots, \beta n$ corresponding to each scanning point in accordance with the value of the fed original image signal Sorg at each scanning point, and feed the generated coefficients respectively to n number of the addition term calculating means 124a', 124b', ..., 124n' including the first addition term calculating means 124a'.

Then, n number of the addition term calculating means 124a', 124b', ..., 124n' including the first addition term calculating means 124a' calculate $\beta1(Sorg-Sus.1)$, $\beta2(Sorg-Sus.2)$, ..., $\beta n(Sorg-Sus.n)$ respectively on the basis of the fed original image signal Sorg, the corresponding unsharp mask signals Sus.1, Sus.2, ..., Sus.n, and the corresponding coefficients $\beta1, \beta2, \ldots \beta n$.

The results of the calculations expressed as $\beta1(Sorg-Sus.1)$, $\beta2(Sorg-Sus.2)$, ..., $\beta n(Sorg-Sus.n)$ are fed to the addition means 125' which calculates as represented by a formula $$S' = Sorg + \sum_{k=1}^{n} \beta k(Sorg - Sus.k) \tag{39}$$

to obtain the operation-processed image signal S'.

FIG. 6C shows a further example of the configuration of the operation device 18 shown in FIG. 2.

With reference to FIG. 6C, the original image signal Sorg is fed to a storage means 121'' from the let side and stored therein. The original image signal Sorg stored in the storage means 121'' is fed to an unsharp mask signal calculating means 122'', a coefficient generating means 123'', an addition term calculating means 124'', and an addition means 125''.

The unsharp mask signal calculating means 122'' calculates the unsharp mask signal Sus.1 by averaging the image signals at N1×N1 scanning points around each scanning point on the basis of the original image signal Sorg. The unsharp mask signal Sus.1 thus calculated is fed to the addition term calculating means 124''.

The coefficient generating means 123'' stores tables specifying the correspondence between the fed image signal and the coefficients $\beta1, \beta2, \ldots, \beta n$. When the original image signal Sorg is fed to the coefficient generating means 123'', the coefficient generating means 123'' refers to the table specifying the correspondence between the fed original image signal Sorg and the coefficient $\beta1$, generates the coefficient $\beta1$ corresponding to each scanning point in accordance with the value of the fed original image signal Sorg at each scanning point, and feeds the coefficient $\beta1$ to the addition term calculating means 124''.

The addition term calculating means 124'' calculates $\beta1(Sorg-Sus.1)$ for each scanning point on the basis of the fed original image signal Sorg, the unsharp mask signal Sus.1 and the coefficient $\beta1$, and feeds out the calculated value.

The result of the calculation expressed as $\beta1(Sorg-Sus.1)$ is fed to the addition means 125'', and the addition means 125'' calculates an image signal $S1 = Sorg. + \beta1(Sorg-Sus.1)$ obtained by intermediate processing of the original image signal Sorg.

The image signal S1 thus obtained is fed back to the storage means 121'' and stored instead of the original image signal Sorg which has been stored in the storage means 121''. The image signal S1 is sent to the unsharp mask signal calculating means 122'', the coefficient generating means 123'' and the addition term calculating means 124''. The unsharp mask signal calculating means 122'' then calculates the unsharp mask signal Sus.2 on the basis of the image signal S1 by averaging the image signals at N2×N2 scanning points around each scanning point. Also, the coefficient generating means 123'' refers to the table specifying the correspondence between the image signal S1 and the coefficient $\beta2$, generates the coefficient $\beta2$ corresponding to each scanning point in accordance with the value of the fed image signal S1 at each scanning point, and feeds the coefficient $\beta2$ to the addition term calculating means 124''. The addition term calculating means 124'' then calculates $\beta2(S1-Sus.2)$. The result of the calculation is sent to the addition means 125'', and an image signal $S2 = S1 + \beta2(S1-Sus.2)$ obtained by second intermediate processing of the image signal S1 is calculated.

The aforesaid loop is repeated n times to calculate an ultimately operation-processed signal S' expressed as $$S' = Sn-1 - \beta n(Sn-1 - Sus.n) \tag{40}$$

Grain noise can be attenuated efficiently in the region where the radiation dose is low and grain noise is perceptible, and the image quality factors such as the sharpness and the contrast can be improved positively in the region where the radiation dose is high and grain noise is originally imperceptible also by calculating the unsharp mask signals Sus.1, Sus.2, ..., Sus.n by use of the intermediate-processed image signals S1, S2, ..., Sn−1 and calculating as represented by Formula (40) in the manner as mentioned above.

When Formula (40) is compared with Formula (37), the same image signal Sn−1 is used as the image signals Sb1 and Sb2 in Formula (37). However, the image signals Sb1 and Sb2 may be different from each other. For example, in FIG. 6C, the fed original image signal Sorg may be stored in the addition term calculating means 124″, and calculations expressed as $\beta 1(Sorg-Sus.1)$ $\beta 2(Sorg-Sus.2)$

. . . . . . . . .

may be carried out in the addition term calculating means 124″ by use of the original image signal Sorg alone, instead of using the image signals S1, S2, . . . , Sn−1 obtained by intermediate processing. In this manner, the signal S′ may ultimately be calculated as expressed by a formula $$S' = Sn - 1 - \beta n(Sorg - Sus.n) \quad (41)$$

Embodiments of the first to fourth X-ray image processing methods in accordance with the present invention will be described hereinbelow.

With reference to FIG. 8 showing an embodiment of the X-ray image processing apparatus for carrying out the first X-ray image processing method in accordance with the present invention, an original photograph 201 carrying an X-ray image of an object recorded thereon is conveyed in a sub-scanning direction as indicated by the arrow Y by a photograph conveyance means 203 operated by a motor 202. On the other hand, reading light 205 produced by a laser beam source 204 is reflected and deflected by a rotating polygon mirror 206 quickly rotated by a motor 213 in the direction as indicated by the arrow, and passes through a converging lens 207 constituted by a fθ lens or the like. The optical path of the reading light 205 is then changed by a mirror 208, and the reading light 205 impinges upon the original photograph 201 and scans it in a main scanning direction as indicated by the arrow X approximately normal to the sub-scanning direction as indicated by the arrow Y. The reading light 205 passes through the original photograph 201 and is intensity-modulated by the density (original image density) of the X-ray image recorded on the original photograph 201. The reading light 205 passing through the original photograph 201 is guided by a light guide member 210, and photoelectrically detected by a photomultiplier 211 as a photodetector. The light guide member 210 is made by the forming of a light guiding material such as an acrylic plate, and has a linear light input face 210a positioned to extend along the main scanning line on the original photograph 201, and a ring-shaped light output face 210b closely contacted with a light receiving face of the photomultiplier 211. The reading light 205 entering the light guide member 210 from its light input face 210a is guided through total reflection inside of the light guide member 210, emanates from the light output face 210b, and is received by the photomultiplier 211. In this manner, the amount of the reading light 205 carrying the X-ray image is detected by the photomultiplier 211.

An analog output signal D generated by the photomultiplier 211 is amplified by an amplifier 216, and digitized by an A/D converter 217 with a predetermined scale factor into an original image density Dorg. The digital signal representing the original image density Dorg thus obtained is fed to an operation device 218. The operation device 218 calculates densities of unsharp masks by averaging the image densities within a predetermined range surrounding each scanning point. The densities of the unsharp masks thus calculated are denoted by Dus.k, where k=1, 2, . . . , n wherein n denotes an integer representing the number of the unsharp masks calculated by changing said predetermined range. The operation device 218 then calculates an image density D′ by carrying out operation processing as represented by $$D' = Db1 - \sum_{k=1}^{n} \beta k(Db2 - Dus.k) \quad (42)$$

by use of Db1 and Db2 each denoting the original image density Dorg fed to the operation device 218 or an image density obtained by carrying out intermediate processing of the signal representing the original image density Dorg, and attenuation coefficients βk, where k=1, 2, . . . , n, prepared in advance to correspond to the unsharp masks.

In this specification, for simplicity of explanation, the same symbol, for example, Dorg is used for denoting the image density and denoting the signal representing the image density.

The simplest operation processing among the operation processing represented by Formula (42) is expressed as $$D' = Db1 - \beta 1(Db2 - Dus.1) \quad (43)$$

wherein a single unsharp mask having the density Dus.1 and an attenuation coefficient β1 where 0 < β1, β1 ≠ 1 are used. Operation processing represented by Formula (43) indicates that spatial frequency components above the spatial frequency component which the density Dus.1 of the unsharp mask has are attenuated positively. Image graininess can be improved apparently and deterioration of other image quality factors such as sharpness can be minimized by accurately selecting the spatial frequency components which are to be attenuated and the extent of attenuation of the spatial frequency components.

The image density D′ obtained by carrying out operation processing in the operation device 218 is stored in a memory 219, and the X-ray image is reproduced and displayed on an image display device 220 by use of the signal representing the image density D′.

Figure 9A:
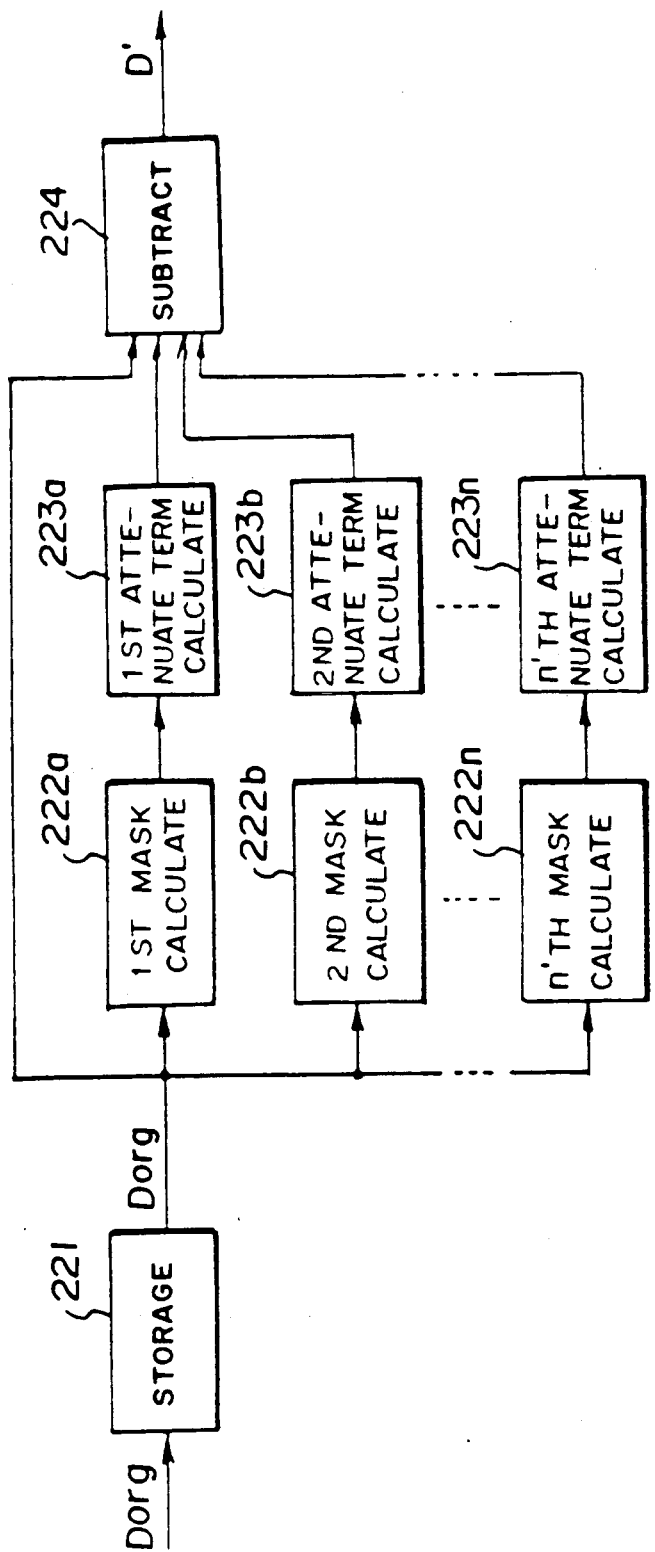

FIGS. 9A, 9B and 9C show different configurations of the operation device 218 shown in FIG. 8.

With reference to FIG. 9A, the signal representing the original image density Dorg is fed to a storage means 221 from the left side and stored therein. The signal representing the original image density Dorg stored in the storage means 221 is directly fed to a subtraction means 224 as will be described later, and fed in parallel to n number of unsharp mask density calculating means 222a, 222b, . . . , 222n including the first unsharp mask density calculating means 222a for calculating the density of the first unsharp mask. The unsharp mask density calculating means 222a, 222b, . . . , 222n calculate unsharp mask densities Dus.1, Dus.2, . . . , Dus.n respectively by averaging the image densities at N1×N1 number of scanning points, N2×N2 number of scanning points, ..., Nn×Nn number of scanning points around each scanning point. The unsharp mask densities Dus.1, Dus.2, ..., Dus.n are respectively fed to n number of attenuation term calculating means 223a, 223b, ..., 223n including the first attenuation term calculating means 223a, which calculate attenuation term β1(Dorg−Dus.1), β2(Dorg−Dus.2), ..., βn(Dorg−Dus.n) respectively. These attenuation terms and the original image density Dorg are fed to the subtraction means 224 which calculates as represented by a formula $$D' = Dorg - \sum_{k=1}^{n} \beta k(Dorg - Dus.k) \quad (44)$$

to obtain the operation-processed image density D'.

FIG. 9B shows an example of the configuration of the operation device 218 different from the configuration shown in FIG. 9A. In FIG. 9B, similar elements are numbered with the same reference numerals with respect to FIG. 9A.

With reference to FIG. 9B, an unsharp mask density calculating means 222' calculates a mean value of the densities at 3×3 scanning points around each scanning point, and then calculates a mean value of the mean values thus obtained. In this manner, the unsharp mask density calculating means 22' calculates mean values of the densities at 9×9 scanning points, 15×15 scanning points and so on, thereby to obtain the densities of the unsharp masks corresponding to the attenuation term calculating means 223a, 223b, ..., 223n, and sends the unsharp mask densities to the attenuation term calculating means 223a, 223b, ..., 223n. With this configuration, the densities of the unsharp masks can be calculated efficiently.

FIG. 9C shows a further example of the configuration of the operation device 218 shown in FIG. 8.

With reference to FIG. 9C, the signal representing the original image density Dorg is temporarily stored in a storage means 221" and then sent to an unsharp mask density calculating means 222". The unsharp mask density calculating means 222" calculates the density Dus.1 of the unsharp mask corresponding to the attenuation coefficient β1 on the basis of the original image density Dorg. The signal representing the unsharp mask density Dus.1 is sent to an attenuation term calculating means 223" which calculates β1(Dorg−Dus.1) and sends the calculated value to a subtraction means 224". In the subtraction means 224", an image density D1=Dorg−β1(Dorg−Dus.1) obtained by intermediate processing of the original image density Dorg is calculated.

The signal representing the image density D1 thus obtained is fed back to the storage means 221" and stored instead of the original image density Dorg which has been stored in the storage means 221". The signal representing the image density D1 is sent to the unsharp mask density calculating means 222", and the density Dus.2 of the unsharp mask corresponding to the attenuation coefficient β2 is then calculated on the basis of the image density D1. The signal representing the unsharp mask density Dus.2 is sent to the attenuation term calculating means 223" which calculates as represented by β2(D1−Dus.2). The result of the calculation is sent to the subtraction means 224", and an image density D2=D1−β2(D1−Dus.2) obtained by second intermediate processing of the the signal representing the image density D1 is calculated.

The aforesaid loop is repeated n times to calculate an ultimately operation-processed image density D' expressed as $$D' = Dn-1-\beta n(Dn-1-Dus.n) \quad (45)$$

Grainy noise can be attenuated efficiently while deterioration of image quality factors such as the sharpness is being minimized also by calculating the unsharp mask densities Dus.1, Dus.2, ..., Dus.n by use of the intermediate-processed image densities D1, D2, ..., Dn-1 and calculating as represented by Formula (45) in the manner as mentioned above.

When Formula (45) is compared with Formula (42), the same image density Dn−1 is used as the image densities Db1 and Db2 in Formula (42). However, the image densities Db1 and Db2 may be different from each other. For example, in FIG. 9C, the signal representing the original image density Dorg may be directly fed also to the attenuation term calculating means 223" and stored therein, and calculations expressed as β1(Dorg−Dus.1)

β2(Dorg−Dus.2)

. . . . . . . . .

may be carried out in the attenuation term calculating means 223" by use of the original image density Dorg alone, instead of using the image densities D1, D2, ..., Dn−1 obtained by intermediate processing. In this manner, the image density D' may ultimately be calculated as represented by a formula $$D' = Dn-1-\beta n(Dorg-Dus.n) \quad (46)$$

Figure 7:
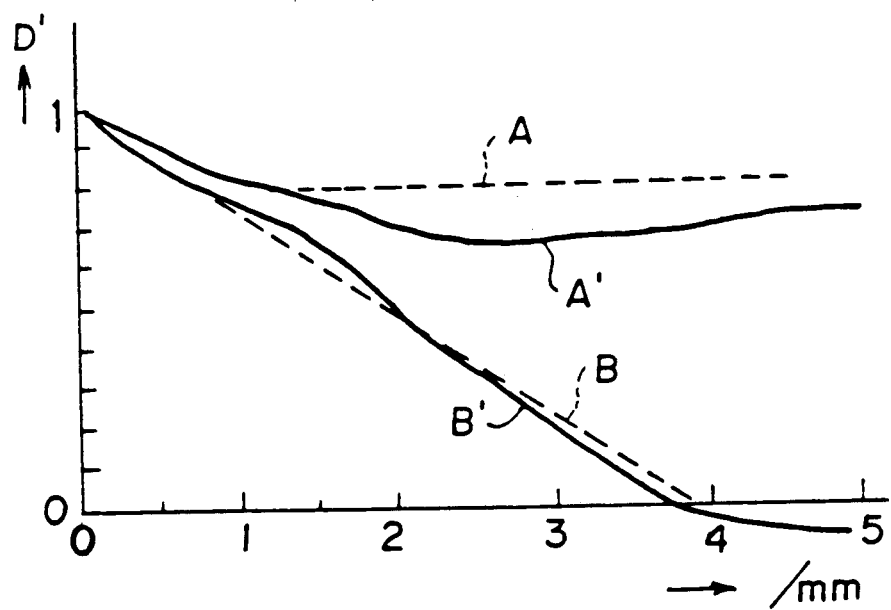
FIG. 7 is a graph showing examples of image densities calculated by using the first X-ray image processing method in accordance with the present invention in terms of a spatial frequency region.

FIG. 7 shows examples of the results of calculations in the case where n=2 (i.e. the number of the unsharp masks is two, and the number of the attenuation coefficients is two) by use of the first X-ray image processing method in accordance with the present invention. The results of calculations are shown with respect to the spatial frequency region. In FIG. 7, the horizontal axis indicates the spatial frequency, and the vertical axis indicates the values relative to the direct current component taken as 1. For simplicity of explanation, signals obtained by Fourier transformation of the signals representing the operation-processed image densities D' and indicated in terms of the spatial frequency region are expressed also as D'.

The graph A is an ideal one indicating the spatial frequency characteristics suitable for restricting grainy noise of an X-ray image and minimizing deterioration of other image quality factors such as the sharpness. The graph A' indicates the results of the calculation represented by a formula $$D' = Dorg-\beta1(Dorg-Dus.1) -\beta2(Dorg-Dus.2) \quad (47)$$

carried out by using a mean value of densities at 15×15 scanning points around each scanning point and a mean value of densities at 5×5 scanning points around each scanning point as the unsharp mask densities Dus.1 and Dus.2 respectively, and using β1=0.1 and β2=0.4 as the attenuation coefficients β1 and β2. The results of the calculation are indicated in terms of the spatial frequency region. The graph A' is substantially approximate to the graph A.

The graph B is an ideal one indicating the spatial frequency characteristics suitable for another X-ray image. The graph B' indicates the results of the calculation represented by a formula $$D' = Dorg - \beta1(Dorg - Dus.1) - \beta2(Dorg - Dus.2) \quad (48)$$

carried out by using a mean value of densities at 15×15 scanning points around each scanning point and a mean value of densities at 3×3 scanning points around each scanning point as the unsharp mask densities Dus.1 and Dus.2 respectively, and using $\beta1=0.1$ and $\beta2=0.8$ as the attenuation coefficients $\beta1$ and $\beta2$. The results of the calculation are indicated in terms of the spatial frequency region. Also, in this case, the graph B' is substantially approximate to the graph B.

As mentioned above, in the case where the X-ray images are classified in accordance with the kind of the object, the intensity of X-rays irradiated to the object, and the like, and operation processing is carried out in accordance with the aforesaid method by selecting the method of calculation of the density of the unsharp mask and selecting the value of the attenuation coefficient to be suitable for each X-ray image, a reproduced visible image wherein grainy noise of the X-ray image is attenuated efficiently and deterioration of other image quality factors such as the sharpness is minimized can be obtained.

An embodiment of the second X-ray image processing method in accordance with the present invention will be described hereinbelow.

In this embodiment, in the apparatus having the configuration as shown in FIG. 8, the digital signal representing the original image density Dorg obtained by the A/D converter 217 in the same manner as mentioned above is fed to the operation device 218. The operation device 218 calculates densities of unsharp masks by averaging the image densities within a predetermined range surrounding each scanning point. The densities of the unsharp masks thus calculated are denoted by Dus.k, where k=1, 2, ..., n wherein n denotes an integer representing the number of the unsharp masks calculated by changing said predetermined range. The operation device 218 then calculates an image density D' by carrying out operation processing as represented by $$D' = Db1 - \sum_{k=1}^{n} \beta k(Db2 - Dus.k) \quad (49)$$

by use of Db1 and Db2 each denoting the original image density Dorg fed to the operation device 218 or an image density obtained by carrying out intermediate processing of the signal representing the original image density Dorg, and attenuation coefficients $\beta k$, where k=1, 2, ..., n, prepared in advance as, for example, a function of the original image density Dorg to correspond to the unsharp masks.

The simplest operation processing among the operation processing represented by Formula (49) is expressed as $$D' = Db1 - \beta1(Db2 - Dus.1) \quad (50)$$

wherein a single unsharp mask having the density Dus.1 and an attenuation coefficient $\beta1$ where $0 \leq \beta1$ are used. Operation processing represented by Formula (50) indicates that spatial frequency components above the spatial frequency component which the density Dus.1 of the unsharp mask has are attenuated positively. Image graininess can be improved apparently and deterioration of other image quality factors such as sharpness can be minimized by accurately selecting the spatial frequency components which are to be attenuated and the extent of attenuation of the spatial frequency components.

The image density D' obtained by carrying out operation processing in the operation device 218 is stored in the memory 219, the X-ray image is reproduced and displayed on the image display device 220 by use of the signal representing the image density D'.

In this embodiment, the operation device 218 may be constituted in the same manner as shown in FIGS. 9A, 9B and 9C.

As shown in FIG. 7, the optimal values of the attenuation coefficients $\beta k$ where k=1, 2, ..., n are first determined by the kind of the X-ray image.

Figure 10:
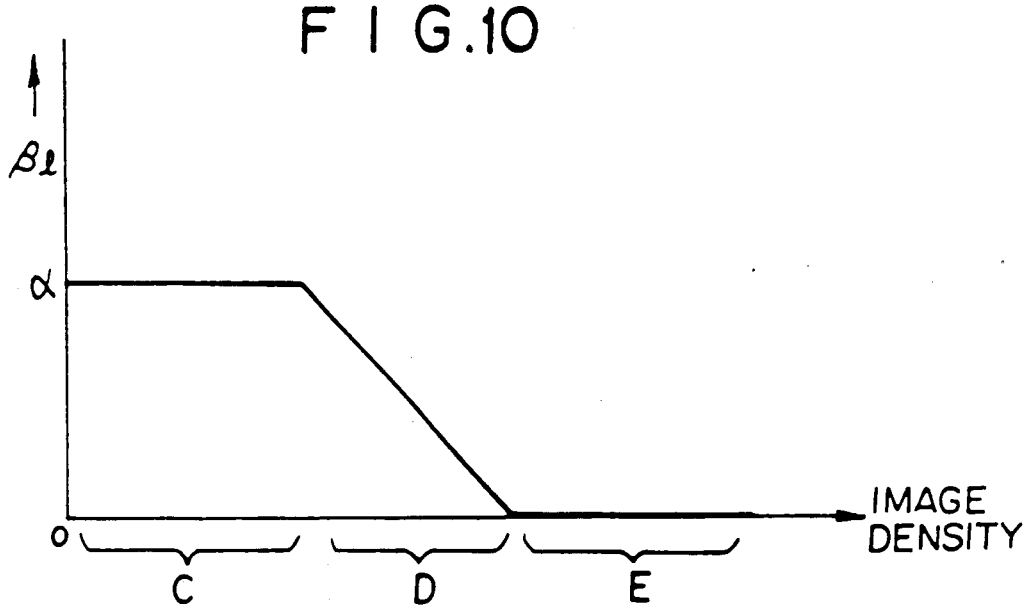
FIG. 10 is a graph showing an example of the function of the attenuation coefficient $\beta 1$ with the image density being a variable in the second X-ray image processing method in accordance with the present invention.

FIG. 10 is a graph showing an example of the function of the attenuation coefficient $\beta1$ with the image density being the variable. The graph indicates that the image is blurred by adjusting so that the attenuation coefficient $\beta1=\alpha$ in a region C where the image density is low and grainy noise is comparatively perceptible, the image blurring is avoided by adjusting so that $\beta1=0$ and the detailed image structure becomes sharp in a region E where the image density is high and grainy noise is comparatively imperceptible, and $\beta1$ is decreased as the image density increases in an intermediate region D. In the case where the attenuation coefficients $\beta k$ where k=1, 2, ..., n are changed in accordance with the image densities in a single X-ray image as shown in FIG. 10, finer image processing can be carried out as compared with the case where $\beta k$ wherein k=1, 2, ..., n having the same values are used over the overall X-ray image.

The graph shown in FIG. 10 is a mere example, and a suitable function form of the attenuation coefficient $\beta1$ is selected in accordance with the kind of the X-ray image, the purpose of image processing and the like. For example, the attenuation coefficient $\beta1$ may vary in a curve form with respect to the image density.

Also, in the case where the attenuation coefficients $\beta k$ where k=1, 2, ..., n are changed for each object in a single image as mentioned above, instead of adjusting $\beta k$ as a function of the image densities, finer image processing can be carried out as in the case where $\beta k$ are adjusted as a function of the image densities.

As mentioned above, in the case where the X-ray images are classified in accordance with the kind of the object in the overall image (for example, the chest, the head or the like of the human body), the intensity of X-rays irradiated to the object, and the like, and operation processing is carried out in accordance with the aforesaid method by selecting the method of calculation of the density of the unsharp mask and selecting the value of the attenuation coefficient to be suitable for each X-ray image, a reproduced visible image wherein grainy noise of the X-ray image is attenuated efficiently in accordance with each region in the image and deterioration of other image quality factors such as the sharpness is minimized can be obtained.

An embodiment of the third X-ray image processing method in accordance with the present invention will be described hereinbelow.

In this embodiment, in the apparatus having the configuration as shown in FIG. 8, the digital signal representing the original image density Dorg obtained by the A/D converter 217 in the same manner as mentioned above is fed to the operation device 218. The original image density Dorg is approximately proportional to the dose of X-rays irradiated to the photographic film for recording the X-ray image on the photographic film. The operation device 218 calculates a density Dus of an unsharp mask by averaging the image densities within a predetermined range surrounding each scanning point. The operation device 218 then calculates an image density D' by carrying out operation processing as represented by $$D' = Dorg + \beta(Dorg - Dus) \quad (51)$$

by use of a coefficient $\beta$ prepared in advance to correspond to the unsharp mask. The coefficient $\beta$ is adjusted as a function of the original image density Dorg so that $\beta < 0$ when the original image density Dorg is low and $\beta > 0$ when the original image density Dorg is high.

With this operation processing wherein $\beta < 0$ in a region of a low X-ray dose and ore grain noise in the X-ray image, spatial frequency components above the spatial frequency component which the density Dus of the unsharp mask has are attenuated in said region. Therefore, in said region, grain noise of the image is restricted and deterioration of other image quality factors such as the sharpness is minimized by appropriately selecting the spatial frequency components which are to be attenuated and the extent of the attenuation. Also, $\beta > 0$ in a region of a high X-ray dose and less grain noise. Therefore, in this region, spatial frequency components above the spatial frequency component which the density Dus of the unsharp mask has are emphasized, and the image quality factors such as the sharpness are improved positively.

Also, as the fourth X-ray image processing method in accordance with the present invention, the operation device 18 may be constituted for:

i) obtaining a single unsharp mask by averaging original image densities within a predetermined range surrounding each scanning point or image densities obtained by carrying out intermediate processing of signals representing the original image densities, or obtaining a plurality of unsharp masks by changing the predetermined range, and denoting densities of the unsharp masks by Dus.k, where k = 1, 2, . . . , n wherein n denotes an integer representing the number of the unsharp masks, ii) denoting a single coefficient corresponding to the single unsharp mask or a plurality of coefficients corresponding to a plurality of the unsharp masks by $\beta k$ where k = 1, 2, . . . , n, iii) adjusting at least a single coefficient $\beta l$, where l denotes an integer within the range of 1 to n, among the coefficients $\beta k$, where k = 1, 2, . . . , n, to be a function shifting from $\beta l < 0$ to $\beta l > 0$ as a dose of the X-rays irradiated to each point on the photographic film increases, and iv) carrying out an operation represented by a formula $$D' = Db1 + \sum_{k=1}^{n} \beta k(Db2 - Dus.k) \quad (52)$$

where Db1 and Db2 each denote the original image density or an image density obtained by carrying out intermediate processing of a signal representing the original image density, and D' denotes an image density obtained by the operation processing, by use of the coefficient $\beta l$.

The image density D' thus obtained by carrying out operation processing in the operation device 218 is stored in the memory 219, and the X-ray image is reproduced and displayed on the image display device 220 by use of the signal representing the image density D'.

Figure 11A:
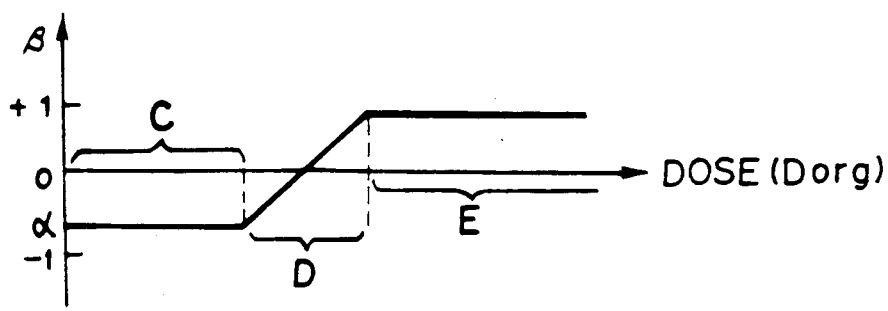
FIGS. 11A, 11B and 11C are graphs showing examples of the function forms of the coefficient $\beta$ in the third and fourth X-ray image processing methods in accordance with the present invention.
Figure 11B:
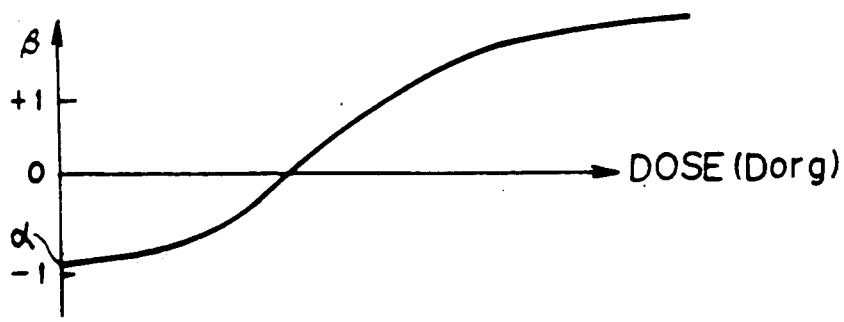
Figure 11C:
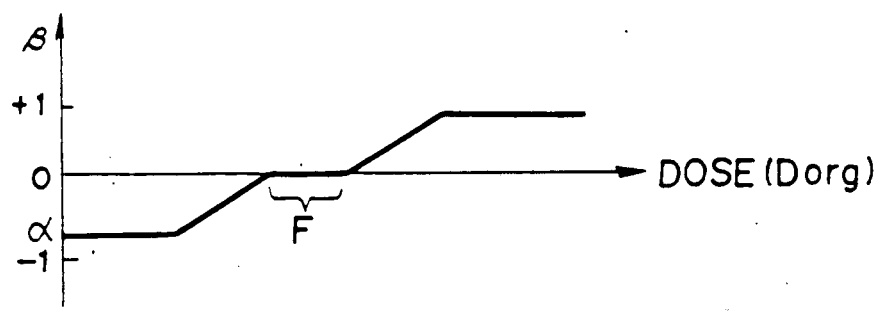

FIGS. 11A, 11B and 11C are graphs showing examples of the functions of the coefficient $\beta$ wherein the dose of X-rays irradiated to the photographic film 201 shown in FIG. 8 is employed as a variable. As mentioned above, the original image density Dorg is read out to be proportional to the X-ray dose. Therefore, the X-ray dose plotted on the horizontal axis may be replaced by the original image density Dorg. Actually, from the viewpoint of signal amount compression, the logarithmic value of the optical amount E of the reading light passing through the original photograph 201 is often used as the signal representing the original image density Dorg (Dorg = k'·log E where k' is a constant). Also, in this case, the (positive) correlation wherein the original image density Dorg becomes higher as the X-ray dose increases do not change.

FIG. 11A shows that the coefficient $\beta$ is adjusted to be $\beta = \alpha (<0)$ for restricting grain noise in a region C wherein the image density is low and grain noise is perceptible, the coefficient $\beta$ is adjusted to be $\beta > 0$ for positively improving the image quality factors such as the contrast and the sharpness and reproducing detailed structures sharply in a region E wherein the image density is high and grain noise is comparatively imperceptible, and the coefficient $\beta$ is increased as the image density becomes higher in an intermediate region D.

FIG. 11B shows the example wherein the coefficient $\beta$ is increased monotonously as the image density becomes higher.

FIG. 11C shows the example wherein the coefficient $\beta$ is adjusted to be $\beta = 0$ in an intermediate region F where the image quality factors are well balanced.

The graphs shown in FIGS. 11A, 11B and 11C are mere examples, and the function form may be selected appropriately from various forms in accordance with the kind of the object or the like insofar as $\beta < 0$ in the region where the image density is low (the X-ray dose is low) and $\beta > 0$ in the region where the image density is high (the X-ray dose is high). Also, experiments carried out by the inventors revealed that, though the function form of $\beta$ differs in accordance with the kind of the object or the like, the coefficient $\beta$ need not generally be adjusted so that $\beta \leq -1$, and substantially appropriate image processing can be achieved in the range of $-1 > \beta$.

Figure 12C:
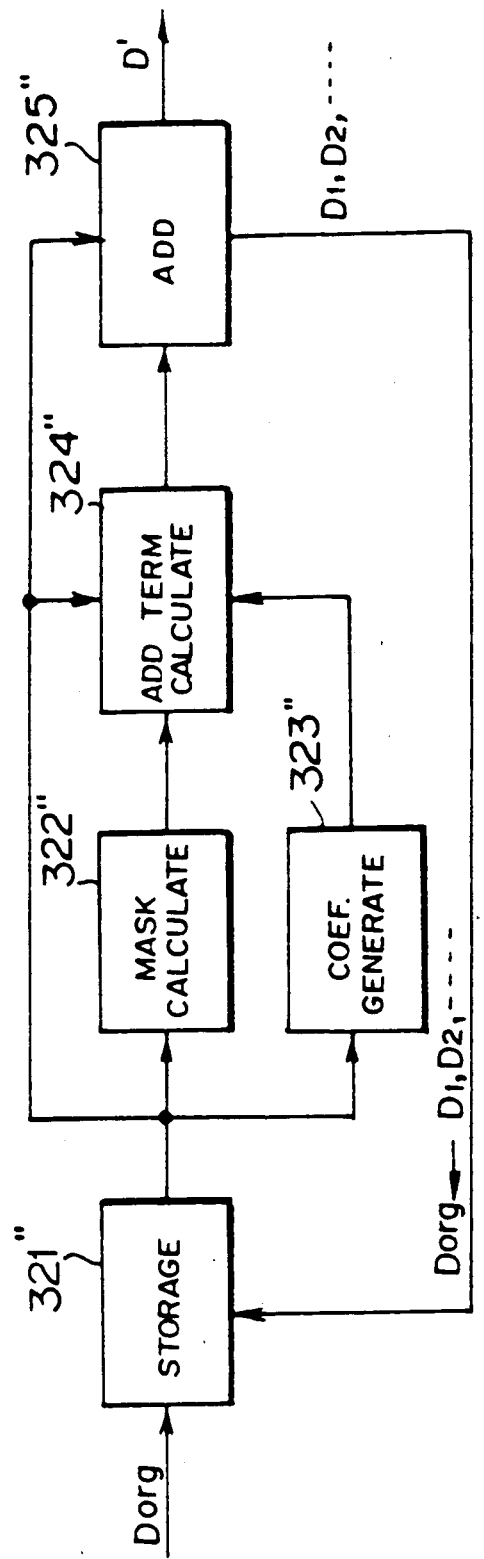

FIGS. 12A, 12B and 12C show examples of the configurations of the operation device 218 shown in FIG. 8 for carrying out the third and fourth X-ray image processing methods in accordance with the present invention.

With reference to FIG. 12A, the signal representing the original image density Dorg is fed to a storage mans 321 from the left side and stored therein. The signal representing the original image density Dorg stored in the storage means 321 is fed to an unsharp mask density calculating means 322, a coefficient generating means 323, an addition term calculating means 324, and an addition means 325.

The unsharp mask density calculating means 322 calculates the density Dus of the unsharp mask by averaging the image densities at N×N scanning points around each scanning point on the basis of the signal representing the original image density Dorg. The signal representing the unsharp mask density Dus thus calculated is fed to the addition term calculating means 324 as will be described later.

The coefficient generating means 323 stores a table specifying the correspondence between the signal representing the original image density Dorg and the coefficient β. The coefficient generating means 323 generates the coefficient β corresponding to each scanning point in accordance with the the fed original image density Dorg at each scanning point, and feeds the coefficient β to the addition term calculating means 324.

The addition term calculating means 324 calculates β(Dorg−Dus) for each scanning point on the basis of the fed signal representing the original image density Dorg, the signal representing the density Dus of the unsharp mask, and the coefficient β, and feeds out the calculated value.

The result of the calculation expressed as β(Dorg−Dus) is fed to the addition means 325, and the addition means 325 calculates the image density D' by carrying out operation processing expressed as $$D' = Dorg + \beta(Dorg - Dus) \quad (53)$$

FIG. 12B shows another example of the configuration of the operation device 218 shown in FIG. 8.

With reference to FIG. 12B, the signal representing the original image density Dorg is fed to a storage means 321' from the left side and stored therein. The signal representing the original image density Dorg stored in the storage means 321' is fed to n number of unsharp mask density calculating means 322a', 322b', ..., 322n', n number of coefficient generating means 323a', 323b', ..., 323n', n number of addition term calculating means 324a', 324b', ..., 324n', and an addition means 325'.

Then, n number of the unsharp mask density calculating means 322a', 322b', ..., 322n' including the first unsharp mask density calculating means 322a' calculate unsharp mask densities Dus.1, Dus.2, ..., Dus.n respectively by averaging the image densities at N1×N1 number of scanning points, N2×N2 number of scanning points, ..., Nn×Nn number of scanning points around each scanning point. The signals representing the unsharp mask densities Dus.1, Dus.2, ..., Dus.n are respectively fed to n number of the addition term calculating means 324a', 324b', ..., 324n' including the first addition term calculating means 324a'.

Also, n number of the coefficient generating means 323a', 323b', ..., 323n' including the first coefficient generating means 323a' store tables specifying the correspondence between the original image density Dorg and the coefficients β1, β2, ... βn, corresponding to n number of the unsharp mask densities Dus.1, Dus.2, ..., Dus.n. The coefficient generating means 323a', 323b', ..., 323n' generate the coefficients β1, β2, ... βn corresponding to each scanning point in accordance with the fed original image density Dorg at each scanning point, and feed the generated coefficients respectively to n number of the addition term calculating means 324a', 324b', ..., 324n' including the first addition term calculating means 324a'.

Then, n number of the addition term calculating means 324a', 324b', ..., 324n' including the first addition term calculating means 324a' calculate β1(Dorg−Dus.1), β2(Dorg−Dus.2), ..., βn(Dorg−Dus.n) respectively on the basis of the fed signal representing the original image density Dorg, the signals representing the densities Dus.1, Dus.2, ..., Dus.n of the corresponding unsharp masks, and the corresponding coefficients β1, β2, ... βn.

The results of the calculations expressed as β1(Dorg−Dus.1), β2(Dorg−Dus.2), ..., βn(Dorg−Dus.n) are fed to the addition means 325' which calculates as represented by a formula $$D' = Dorg + \sum_{k=1}^{n} \beta k(Dorg - Dus.k) \quad (54)$$

to obtain the operation-processed image density D'.

FIG. 12C shows a further example of the configuration of the operation device 218 shown in FIG. 8.

With reference to FIG. 12C, the signal representing the original image density Dorg is fed to a storage means 321'' from the left side and stored therein. The signal representing the original image density Dorg stored in the storage means 321'' is fed to an unsharp mask density calculating means 322'', a coefficient generating means 323'', an addition term calculating means 324'', and an addition means 325''.

The unsharp mask density calculating means 322'' calculates the density Dus.1 of the unsharp mask by averaging the image densities at N1×N1 scanning points around each scanning point on the basis of the signal representing the original image density Dorg. The signal representing the density Dus.1 of the unsharp mask thus calculated is fed to the addition term calculating means 324''.

The coefficient generating means 323'' stores tables specifying the correspondence between the image density and the coefficients β1, β2, ..., βn. When the signal representing the original image density Dorg is fed to the coefficient generating means 323'', the coefficient generating means 323'' refers to the table specifying the correspondence between the fed original image density Dorg and the coefficient β1, generates the coefficient β1 corresponding to each scanning point in accordance with the fed original image density Dorg at each scanning point, and feeds the coefficient β1 to the addition term calculating means 324''.

The addition term calculating means 324'' calculates β1(Dorg−Dus.1) for each scanning point on the basis of the fed signal representing the original image density Dorg, the signal representing the density Dus.1 of the unsharp mask, and the coefficient β1, and feeds out the calculated value.

The result of the calculation expressed as β(Dorg−Dus.1) is fed to the addition means 325'', and the addition means 325'' calculates an image density D1=Dorg+β1(Dorg−Dus.1) obtained by intermediate processing of the original image density Dorg.

The signal representing the image density D1 thus obtained is fed back to the storage means 321'' and stored instead of the signal representing the original image density Dorg which has been stored in the storage means 321''. The signal representing the image density D1 is sent to the unsharp mask density calculating means 322", the coefficient generating means 323" and the addition term calculating means 324". The unsharp mask density calculating means 322" then calculates the density Dus.2 of the unsharp mask on the basis of the image density D1 by averaging the image densities at N2×N2 scanning points around each scanning point. Also, the coefficient generating means 323" refers to the table specifying the correspondence between the image density D1 and the coefficient $\beta 2$, generates the coefficient $\beta 2$ corresponding to each scanning point in accordance with the fed image density D1 at each scanning point, and feeds the coefficient $\beta 2$ to the addition term calculating means 324". The addition term calculating means 324" then calculates $\beta 2(D1-Dus.2)$. The result of the calculation is sent to the addition means 325", and an image density $D2 = D1 + \beta 2(D1-Dus.2)$ obtained by second intermediate processing of the signal representing the image density D1 is calculated.

The aforesaid loop is repeated n times to calculate an ultimately operation-processed density D' expressed as $$D' = Dn-1 - \beta n(Dn-1-Dus.n) \quad (55)$$

Grain noise can be attenuated efficiently in the region where the X-ray dose is low and grain noise is perceptible, and the image quality factors such as the sharpness and the contrast can be improved positively in the region where the X-ray dose is high and grain noise is originally imperceptible also by calculating the unsharp mask density Dus.1, Dus.2, ..., Dus.n by use of the intermediate-processed image densities D1, D2, ..., Dn-1 and calculating as represented by Formula (55) in the manner as mentioned above.

When Formula (55) is compared with Formula (52), the same image density Dn−1 is used as the image densities Db1 and Db2 in Formula (52). However, the image densities Db1 and Db2 may be different from each other. For example, in FIG. 12C, the fed signal representing the original image density Dorg may be stored in the addition term calculating means 324", and calculations expressed as $\beta 1(Dorg - Dus.1)$ $\beta 2(Dorg - Dus.2)$

. . . . . . . . .

may be carried out in the addition term calculating means 324" by use of the original image density Dorg alone, instead of using the image densities D1, D2, ... , Dn−1 obtained by intermediate processing. In this manner, the density D' ultimately be calculated as expressed by a formula $$D' = Dn-1 - \beta n(Dorg - Dus.n) \quad (56)$$

I claim:

1. A radiation image processing method which, in the course of performing a read-out operation by scanning a stimulable phosphor, carrying a radiation image stored thereon, with stimulating rays which cause said stimulable phosphor to emit light in proportion to the stored radiation energy, obtaining an original image signal by photoelectrically detecting the light emitted by each scanning point on said stimulable phosphor, and reproducing said radiation image as a visible image on a recording medium, comprises the steps of:

i) obtaining a single unsharp mask signal Sus.k by averaging original image signals within a predetermined range surrounding each scanning point or averaging image signals obtained by carrying out intermediate processing of the original image signals, or obtaining a plurality of unsharp mask signals Sus.k, where k=1, 2, ..., n, wherein n denotes an integer representing the number of said unsharp mask signals, by changing said predetermined range, ii) denoting a single attenuation coefficient corresponding to single said unsharp mask signal or denoting a plurality of attenuation coefficients corresponding to a plurality of said unsharp mask signals by $\beta k$ where k=1, 2, ..., n, and iii) adjusting at least a single attenuation coefficient $\beta l$, where l denotes an integer within the range of 1 to n, among step ii's said single attenuation coefficient or attenuation coefficients $\beta k$, where k'1, 2, ..., n, to be a constant within the range of $0 < \beta l$ wherein $\beta l \neq 1$, iv) carrying out an operation represented by a formula $$S' = Sb1 - \sum_{k=1}^{n} \beta k(Sb2 - Sus \cdot k)$$

where Sb1 and Sb2 each denote said original image signal or an image signal obtained by carrying out intermediate processing of said original image signal, and S' denotes an image signal obtained by the operation processing, by use of said attenuation coefficient $\beta l$, whereby there is performed an attenuating of spatial frequency components above the spatial frequency component which the unsharp mask signal Sus.l corresponding to said attenuation coefficient $\beta l$ has.

2. A radiation image processing method as defined in claim 1 wherein said attenuation coefficient $\beta l$ is a constant within the range of $0 < \beta l < 1$.

3. A radiation image processing method as defined in claim 1 or 2 wherein both Sb1 and Sb2 each denoting said original image signal or an image signal obtained by carrying out intermediate processing of said original image signal are same said original image signal.

4. A radiation image processing method as defined in claim 1 or 2 wherein both Sb1 and Sb2 each denoting said original image signal or an image signal obtained by carrying out intermediate processing of said original image signal are the same image signal obtained by carrying out the same intermediate processing of said original image signal.

5. A radiation image processing method as defined in claim 1 or 2 wherein one of Sb1 and Sb2 each denoting said original image signal or an image signal obtained by carrying out intermediate processing of said original image signal is said original image signal or an image signal obtained by carrying out first intermediate processing of said original image signal, and the other of Sb1 and Sb2 is an image signal obtained by carrying out second intermediate processing of said original image signal.

6. A radiation image processing apparatus in a radiation image recording and reproducing system for scanning a stimulable phosphor, carrying a radiation image stored thereon, with stimulating rays which cause said stimulable phosphor to emit light in proportion to the stored radiation energy, obtaining an original image signal by photoelectrically detecting the light emitted by each scanning point on said stimulable phosphor, processing the original image signal by an operation device, and reproducing said radiation image as a visible image on a recording medium by use of the processed image signal, wherein said operation device comprises:

1) means for obtaining a single unsharp mask signal Sus.k by averaging original image signals within a predetermined range surrounding each scanning point or averaging image signals obtained by carrying out intermediate processing of the original image signals, or obtaining a plurality of unsharp mask signals Sus.k, where $k = 1, 2, \ldots, n$, wherein n denotes an integer representing the number of said unsharp mask signals, by changing said predetermined range,
ii) means for denoting a single attenuation coefficient corresponding to single said unsharp mask signal or denoting a plurality of attenuation coefficients corresponding to a plurality of said unsharp mask signals by $\beta k$ where $k = 1, 2, \ldots, n$,
iii) means for adjusting at least a single attenuation coefficient $\beta l$, where l denotes an integer within the range of 1 to n, among step ii's said single attenuation coefficient or attenuation coefficients $\beta k$, where $k = 1, 2, \ldots, n$, to be a constant within the range of $$0 < \beta l \text{ wherein } \beta l \neq 1,$$

and iv) means for carrying out an operation represented by a formula $$S' = Sb1 - \sum_{k=1}^{n} \beta k(Sb2 - Sus \cdot k)$$

where Sb1 and Sb2 each denote said original image signal or an image signal obtained by carrying out intermediate processing of said original image signal, and S' denotes an image signal obtained by the operation processing, by use of said attenuation coefficient $\beta l$.

7. A radiation image processing method which, in the course of performing a read-out operation by scanning a stimulable phosphor, carrying a radiation image stored thereon, with stimulating rays which cause said stimulable phosphor to emit light in proportion to the stored radiation energy, obtaining an original image signal by photoelectrically detecting the light emitted by each scanning point on said stimulable phosphor, and reproducing said radiation image as a visible image on a recording medium, comprises the steps of:

i) obtaining a single unsharp mask signal Sus.k by averaging original image signals within a predetermined range surrounding each scanning point or averaging image signals obtained by carrying out intermediate processing of the original image signals, or obtaining a plurality of unsharp mask signals Sus.k, where $k = 1, 2, \ldots, n$, wherein n denotes an integer representing the number of said unsharp mask signals, by changing said predetermined range,
ii) denoting a single attenuation coefficient corresponding to single said unsharp mask signal or denoting a plurality of attenuation coefficients corresponding to a plurality of said unsharp mask signals by $\beta k$ where $k = 1, 2, \ldots, n$,
iii) adjusting at least a single attenuation coefficient $\beta l$, where l denotes an integer within the range of 1 to n, among step ii's said single attenuation coefficient or attenuation coefficients $\beta k$, where $k = 1, 2, \ldots, n$, to be a variable which is always within the range of $$0 \leq \beta l$$

and which varies in each said radiation image, and
iv) carrying out an operation represented by a formula $$S' = Sb1 - \sum_{k=1}^{n} \beta k(Sb2 - Sus \cdot k)$$

wherein Sb1 and Sb2 each denote said original image signal or an image signal obtained by carrying out intermediate processing of said original image signal, and S' denotes an image signal obtained by the operation processing, by use of said attenuation coefficient $\beta l$, whereby there is performed an attenuating of spatial frequency components above the spatial frequency component which the unsharp mask signal Sus.l corresponding to said attenuation coefficient $\beta l$ has.

8. A radiation image processing method as defined in claim 7 wherein said attenuation coefficient $\beta l$ is a variable which is always within the range of $$0 \leq \beta l < 1.$$

9. A radiation image processing method as defined in claim 8 wherein said attenuation coefficient $\beta l$ is a function of said original image signal or of the image signal obtained by carrying out intermediate processing of said original image signal.

10. A radiation image processing method as defined in claim 7 wherein said attenuation coefficient $\beta l$ is a function of said original image signal or of the image signal obtained by carrying out intermediate processing of said original image signal.

11. A radiation image processing method as defined in any one of claims 7 to 10 wherein both Sb1 and Sb2 each denoting said original image signal or an image signal obtained by carrying out intermediate processing of said original image signal are the same said original image signal.

12. A radiation image processing method as defined in any one of claims 7 to 10 wherein both Sb1 and Sb2 each denoting said original image signal or an image signal obtained by carrying out intermediate processing of said original image signal are the same image signal obtained by carrying out the same intermediate processing of said original image signal.

13. A radiation image processing method as defined in any one of claims 7 to 10 wherein one of Sb1 and Sb2 each denoting said original image signal or an image signal obtained by carrying out intermediate processing of said original image signal is said original image signal or an image signal obtained by carrying out first intermediate processing of said original image signal, and the other of Sb1 and Sb2 is an image signal obtained by carrying out second intermediate processing of said original image signal.

14. A radiation image processing apparatus in a radiation image recording and reproducing system for scanning a stimulable phosphor, carrying a radiation image stored thereon, with stimulating rays which cause said stimulable phosphor to emit light in proportion to the stored radiation energy, obtaining an original image signal by photoelectrically detecting the light emitted by each scanning point on said stimulable phosphor, processing the original image signal by an operation device, and reproducing said radiation image as a visible image on a recording medium by use of the processed image signal, wherein said operation device comprises:
1) means for obtaining a single unsharp mask signal Sus.k by averaging original image signals within a predetermined range surrounding each scanning point or averaging image signals obtained by carrying out intermediate processing of the original image signals, or obtaining a plurality of unsharp mask signals Sus.k, where k=1, 2, ..., n, wherein n denotes an integer representing the number of said unsharp mask signals, by changing said predetermined range,
ii) means for denoting a single attenuation coefficient corresponding to single said unsharp mask signal or denoting a plurality of attenuation coefficients corresponding to a plurality of said unsharp mask signals by $\beta k$ where k=1, 2, ..., n,
iii) means for adjusting at least a single attenuation coefficient $\beta l$, where l denotes an integer within the range of 1 to n, among step ii's said single attenuation coefficient or attenuation coefficients $\beta k$, where k=1, 2, ..., n, to be a variable which is always within the range of $$0 \leq \beta l$$

and which varies in each said radiation image, and
iv) means for carrying out an operation represented by a formula $$S' = Sb1 - \sum_{k=1}^{n} \beta k(Sb2 - Sus \cdot k)$$

where Sb1 and Sb2 each denote said original image signal or an image signal obtained by carrying out intermediate processing of said original image signal, and S' denotes an image signal obtained by the operation processing, by use of said attenuation coefficient $\beta l$.

15. A radiation image processing method which, in the course of performing a read-out operation by scanning a stimulable phosphor, carrying a radiation image stored thereon, by exposure to radiation with stimulating rays which cause said stimulable phosphor to emit light in proportion to the stored radiation energy, obtaining an original image signal by photoelectrically detecting the light emitted by each scanning point on said stimulable phosphor, and reproducing said radiation image as a visible image on a recording medium, comprises the steps of:

i) obtaining a single unsharp mask signal Sus by averaging original image signals within a predetermined range surrounding each scanning point,
ii) denoting a coefficient corresponding to said unsharp mask signal Sus by $\beta$,
iii) adjusting said coefficient $\beta$ to be a function shifting from $\beta<0$ to $\beta>0$ as a dose of said radiation irradiated to each point on said stimulable phosphor increases, and
iv) carrying out an operation represented by a formula $$S' = Sorg + \beta(Sorg - Sus)$$

where Sorg denotes said original image signal, and S' denotes an image signal obtained by the operation processing, by use of said coefficient $\beta$, whereby there is performed an attenuating of spatial frequency components above the spatial frequency component which said unsharp mask signal Sus has in a region of a low radiation dose inside of single said radiation image, and emphasizing the spatial frequency components above the spatial frequency component which said unsharp mask signal Sus has in a region of a high radiation dose inside of single said radiation image.

16. A radiation image processing method which, in the course of performing a read-out operation by scanning a stimulable phosphor, carrying a radiation image stored thereon, by exposure to radiation with stimulating rays which cause said stimulable phosphor to emit light in proportion to the stored radiation energy, obtaining an original image signal by photoelectrically detecting the light emitted by each scanning point on said stimulable phosphor, and reproducing said radiation image as a visible image on a recording medium, comprises the steps of:

i) obtaining a single unsharp mask signal Sus.k by averaging original image signals within a predetermined range surrounding each scanning point or averaging image signals obtained by carrying out intermediate processing of the original image signals, or obtaining a plurality of unsharp mask signals Sus.k, where k=1, 2, ..., n, wherein n denotes an integer representing the number of said unsharp mask signals, by changing said predetermined range,
ii) denoting a single coefficient corresponding to single said unsharp mask signal or denoting a plurality of coefficients corresponding to a plurality of said unsharp mask signals by $\beta k$ where k=1, 2, ..., n,
iii) adjusting at least a single coefficient $\beta l$, where l denotes an integer within the range of 1 to n, among step ii's said single coefficient or coefficients $\beta k$, where k=1, 2, ..., n, to be a function shifting from $\beta l<0$ to $\beta l>0$ as a dose of said radiation irradiated to each point on said stimulable phosphor increases, and
iv) carrying out an operation represented by a formula $$S' = Sb1 - \sum_{k=1}^{n} \beta k(Sb2 - Sus \cdot k)$$

where Sb1 and Sb2 each denote said original image signal or an image signal obtained by carrying out intermediate processing of said original image signal, and S' denotes an image signal obtained by the operation processing, by use of said coefficient $\beta l$, whereby there is performed an attenuating of spatial frequency components above the spatial frequency component which the unsharp mask signal Sus.l corresponding to said coefficient $\beta l$ has in a region of a low radiation dose inside of single said radiation image, and emphasizing the spatial frequency components above the spatial frequency component which the unsharp mask signal Sus.l corresponding to said coefficient $\beta l$ has in a region of a high radiation dose inside of single said radiation image.

17. A radiation image processing apparatus in a radiation image recording and reproducing system for scanning a stimulable phosphor carrying a radiation image stored thereon by exposure to radiation therefor stimulating rays which cause said stimulable phosphor to emit light in proportion to the stored radiation energy, obtaining an original image signal by photoelectrically detecting the light emitted by each scanning point on said stimulable phosphor, processing the original image signal by an operation device, and reproducing said radiation image as a visible image on a recording medium by use of the processed image signal, wherein the improvement comprises constituting said operation device for:
   i) obtaining an unsharp mask signal Sus by averaging original image signals within a predetermined range surrounding each scanning point,
   ii) denoting a coefficient corresponding to said unsharp mask signal Sus by $\beta$,
   iii) adjusting said coefficient $\beta$ to be a function-shifting from $\beta<0$ to $\beta>0$ as a dose of said radiation irradiated to each point on said stimulable phosphor increases, and
   iv) carrying out an operation represented by a formula $$S' = Sorg + \beta(Sorg - Sus)$$

where Sorg denotes said original image signal, and S' denotes an image signal obtained by the operation processing, by use of said coefficient $\beta$.

18. A radiation image processing apparatus in a radiation image recording and reproducing system for scanning a stimulable phosphor, carrying a radiation image stored thereon by exposure to radiation, with stimulating rays which cause said stimulable phosphor to emit light in proportion to the stored radiation energy, obtaining an original image signal by photoelectrically detecting the light emitted by each scanning point on said stimulable phosphor, processing the original image signal by an operation device, and reproducing said radiation image as a visible image on a recording medium by use of the processed image signal, wherein said operation device comprises:
   i) means for obtaining a single unsharp mask signal Sus.k by averaging original image signals within a predetermined range surrounding each scanning point or averaging image signals obtained by carrying out intermediate processing of the original image signals, or obtaining a plurality of unsharp mask signals Sus.k, where $k=1, 2, \ldots, n$, wherein n denotes an integer representing the number of said unsharp mask signals, by changing said predetermined range,
   ii) means for denoting a single attenuation coefficient corresponding to single said unsharp mask signal or denoting a plurality of coefficients corresponding to a plurality of said unsharp mask signals by $\beta k$ where $k=1, 2, \ldots, n$,
   iii) means for adjusting at least a single coefficient $\beta l$, where l denotes an integer within the range of 1 to n, among step ii's said single attenuation coefficient or coefficients $\beta k$, where $k=1, 2, \ldots, n$, to be a function shifting from $\beta l<0$ to $\beta l>0$ as a dose of said radiation irradiated to each point on said stimulable phosphor increases, and
   iv) means for carrying out an operation represented by a formula $$S' = Sb1 - \sum_{k=1}^{n} \beta k(Sb2 - Sus \cdot k)$$

where Sb1 and Sb2 each denote said original image signal or an image signal obtained by carrying out intermediate processing of said original image signal, and S' denotes an image signal obtained by the operation processing, by use of said coefficient $\beta l$.

19. An X-ray image processing method which comprises the steps of:
   in the course of scanning an original photograph carrying an X-ray image recorded thereon, reading out an original image density at each scanning point on said original photograph, and reproducing said X-ray image as a visible image on a copy photograph or the like,
   i) obtaining a single unsharp mask by averaging original image densities within a predetermined range surrounding each scanning point or image densities obtained by carrying out intermediate processing of signals representing the original image densities, or obtaining a plurality of unsharp masks by changing said predetermined range, and denoting densities of said unsharp masks by Dus.k, where $k=1, 2, \ldots, n$ wherein n denotes an integer representing the number of said unsharp masks,
   ii) denoting a single attenuation coefficient corresponding to single said unsharp mask or a plurality of attenuation coefficients corresponding to a plurality of said unsharp masks by $\beta k$ where $k=1, 2, \ldots, n$,
   iii) adjusting at least a single attenuation coefficient $\beta l$, where l denotes an integer within the range of 1 to n, among said attenuation coefficients $\beta k$, where $k=1, 2, \ldots, n$, to be a constant within the range of $$0 < \beta l \text{ wherein } \beta l \neq 1,$$

iv) carrying out an operation represented by a formula $$D' = Db1 - \sum_{k=1}^{n} \beta k(Db2 - Dus.k)$$

where Db1 and Db2 each denote said original image density or an image density obtained by carrying out intermediate processing of a signal representing said original image density, and D' denotes an image density obtained by the operation processing, by use of said attenuation coefficient $\beta l$, and v) attenuating spatial frequency components above the spatial frequency component which the density Dus.l of the unsharp mask corresponding to said attenuation coefficient $\beta l$ has.

20. An X-ray image processing method as defined in claim 19 wherein said attenuation coefficient $\beta l$ is a constant within the range of $$0 < \beta l < 1.$$

21. An X-ray image processing method as defined in claim 19 or 20 wherein both Db1 and Db2 each denoting said original image density or an image density obtained by carrying out intermediate processing of a signal representing said original image density are same said original image density.

22. An X-ray image processing method as defined in claim 19 or 20 wherein both Db1 and Db2 each denoting said original image density or an image density obtained by carrying out intermediate processing of a signal representing said original image density are the same image density obtained by carrying out the same intermediate processing of the signal representing said original image density.

23. An X-ray image processing method as defined in claim 19 or 20 wherein one of Db1 and Db2 each denoting said original image density or an image density obtained by carrying out intermediate processing of a signal representing said original image density is said original image density or an image density obtained by carrying out first intermediate processing of the signal representing said original image density, and the other of Db1 and Db2 is an image density obtained by carrying out second intermediate processing of the signal representing said original image density.

24. An X-ray image processing apparatus for processing a signal representing an original image density, which has been read out at each scanning point on an original photograph carrying an X-ray image recorded thereon, by an operation device, and reproducing said X-ray image as a visible image on a copy photograph or the like by use of the signal representing the processed image density, wherein said operation device comprises:
i) means for obtaining a single unsharp mask by averaging original image densities within a predetermined range surrounding each scanning point or averaging image densities obtained by carrying out intermediate processing of signals representing the original image densities, or obtaining a plurality of unsharp masks by changing said predetermined range, and denoting densities of said unsharp masks by Dus.k, where k=1, 2, ..., n, wherein n denotes an integer representing the number of said unsharp masks,
ii) means for denoting a single attenuation coefficient corresponding to single said unsharp mask or denoting a plurality of attenuation coefficients corresponding to a plurality of said unsharp masks by $\beta k$ where k=1, 2, ..., n,
iii) means for adjusting at least a single attenuation coefficient $\beta l$, where l denotes an integer within the range of 1 to n, among step ii's said single attenuation coefficient or attenuation coefficients $\beta k$, where k=1, 2, ..., n, to be a constant within the range of $$0 < \beta l \text{ wherein } \beta l \neq 1,$$

and
iv) means for carrying out an operation represented by a formula $$D' = Db1 - \sum_{k=1}^{n} \beta k (Db2 - Dus.k)$$

where Db1 and Db2 each denote said original image density or an image density obtained by carrying out intermediate processing of a signal representing said original image density, and D' denotes an image density obtained by the operation processing, by use of said attenuation coefficient $\beta l$.

25. An X-ray image processing method which, in the course of performing a read out operation by scanning an original photograph carrying an X-ray image recorded thereon, reading out an original image density at each scanning point on said original photograph, and reproducing said X-ray image as a visible image on a copy photograph or the like, comprises the steps of:
i) obtaining a single unsharp mask by averaging original image densities within a predetermined range surrounding each scanning point or averaging image densities obtained by carrying out intermediate processing of signals representing the original image densities, or obtaining a plurality of unsharp masks by changing said predetermined range, and denoting densities of said unsharp masks by Dus.k, where k=1, 2, ..., n, wherein n denotes an integer representing the number of said unsharp masks,
ii) denoting a single attenuation coefficient corresponding to single said unsharp mask or denoting a plurality of attenuation coefficients corresponding to a plurality of said unsharp masks by $\beta k$ where k=1, 2, ..., n,
iii) adjusting at least a single attenuation coefficient $\beta l$, where l denotes an integer within the range of 1 to n, among step ii's said single attenuation coefficient or attenuation coefficients $\beta k$, where k=1, 2, ..., n, to be a variable which is always within the range of $$0 \leq \beta l$$

and which varies in each said X-ray image, and
iv) carrying out an operation represented by a formula $$D' = Db1 - \sum_{k=1}^{n} \beta k (Db2 - Dus.k)$$

where Db1 and Db2 each denote said original image density or an image density obtained by carrying out intermediate processing of a signal representing said original image density, and D' denotes an image density obtained by the operation processing, by use of said attenuation coefficient $\beta l$, whereby there is performed an attenuating of spatial frequency components above the spatial frequency component which the density Dus.l of the unsharp mask corresponding to said attenuation coefficient $\beta l$ has.

26. An X-ray image processing method as defined in claim 25 wherein said attenuation coefficient $\beta l$ is a variable which is always within the range of $0 \leq \beta 1 < 1$.

27. An X-ray image processing method as defined in claim 25 wherein said attenuation coefficient $\beta 1$ is a function of said original image density or of the image density obtained by carrying out intermediate processing of the signal representing said original image density.

28. An X-ray image processing method as defined in claim 26 wherein said attenuation coefficient $\beta 1$ is a function of said original image density or of the image density obtained by carrying out intermediate processing of the signal representing said original image density.

29. An X-ray image processing method as defined in any one of claims 25 to 28 wherein both Db1 and Db2 each denoting said original image density or an image density obtained by carrying out intermediate processing of a signal representing said original image density are same said original image density.

30. An X-ray image processing method as defined in any one of claims 25 to 28 wherein both Db1 and Db2 each denoting said original image density or an image density obtained by carrying out intermediate processing of a signal representing said original image density are the same image density obtained by carrying out the same intermediate processing of the signal representing said original image density.

31. An X-ray image processing method as defined in any one of claims 25 to 28 wherein one of Db1 and Db2 each denoting said original image density or an image density obtained by carrying out intermediate processing of a signal representing said original image density is said original image density or an image density obtained by carrying out first intermediate processing of the signal representing said original image density, and the other of Db1 and Db2 is an image density obtained by carrying out second intermediate processing of the signal representing said original image density.

32. An X-ray image processing apparatus for processing a signal representing an original image density, which has been read out at each scanning point on an original photograph carrying an X-ray image recorded thereon, by an operation device, and reproducing said X-ray image as a visible image on a copy photograph or the like by use of the signal representing the processed image density, wherein said operation device comprises:
i) means for obtaining a single unsharp mask by averaging original image densities within a predetermined range surrounding each scanning point or averaging image densities obtained by carrying out intermediate processing of signals representing the original image densities, or obtaining a plurality of unsharp masks by changing said predetermined range, and denoting densities of said unsharp masks by Dus.k, where k=1, 2, ..., n, wherein n denotes an integer representing the number of said unsharp masks,
ii) means for denoting a single attenuation coefficient corresponding to single said unsharp mask or denoting a plurality of attenuation coefficients corresponding to a plurality of said unsharp masks by $\beta k$ where k=1, 2, ..., n,
iii) means for adjusting at leas a single attenuation coefficient $\beta 1$, where l denotes an integer within the range of 1 to n, among step ii's said single attenuation coefficient or attenuation coefficients $\beta k$, where k=1, 2, ..., n, to be a variable which is always within the range of $0 \leq \beta 1$ and which varies in each said X-ray image, and
iv) means for carrying out an operation represented by a formula $$D' = Db1 - \sum_{k=1}^{n} \beta k(Db2 - Dus.k)$$

where Db1 and Db2 each denote said original image density or an image density obtained by carrying out intermediate processing of a signal representing said original image density, and D' denotes an image density obtained by the operation processing, by use of said attenuation coefficient $\beta 1$.

33. An X-ray image processing method which comprises the steps of:
in the course of scanning an original photograph carrying an X-ray image recorded thereon and obtained by exposing a photographic film to X-rays, reading out an original image density at each scanning point on said original photograph, and reproducing said X-ray image as a visible image on a copy photograph or the like,
i) obtaining an unsharp mask by averaging original image densities within a predetermined range surrounding each scanning point, and denoting a density of said unsharp mask by Dus,
ii) denoting a coefficient corresponding to said unsharp mask by $\beta$,
iii) adjusting said coefficient $\beta$ to be a function shifting from $\beta<0$ to $\beta>0$ as a dose of said X-rays irradiated to each point on said photographic film increases,
iv) carrying out an operation represented by a formula $D' = Dorg + \beta(Dorg - Dus)$ where Dorg denotes said original image density, and D' denotes an image density obtained by the operation processing, by use of said coefficient $\beta$, and
v) attenuating spatial frequency components above the spatial frequency component which said unsharp mask density Dus has in a region of a low X-ray dose inside of signal said X-ray image, and emphasizing the spatial frequency components above the spatial frequency component which said unsharp mask density Dus has in a region of a high X-ray dose inside of single said X-ray image.

34. An X-ray image processing method which in the course of performing a read out operation by scanning an original photograph carrying an X-ray image recorded thereon as obtained by exposing a photographic film to X-rays, reading out an original image density at each scanning point on said original photograph, and reproducing said X-ray image as a visible image on a copy photograph or the like, comprises the steps of:
i) obtaining a single unsharp mask by averaging original image densities within a predetermined range surrounding each scanning point or averaging image densities obtained by carrying out intermediate processing of signals representing the original image densities, or obtaining a plurality of unsharp masks by changing said predetermined range, and denoting densities of said unsharp masks by Dus.k, where k=1, 2, ..., n, wherein n denotes an integer representing the number of said unsharp masks, ii) denoting a single coefficient corresponding to single said unsharp mask or denoting a plurality of coefficients corresponding to a plurality of said unsharp masks by $\beta k$ where k=1, 2, ..., n, iii) adjusting at least a single attenuation coefficient $\beta l$, where l denotes an integer within the range of 1 to n, among step ii's said single coefficient or coefficients $\beta k$, where k=1, 2, ..., n, to be a function shifting from $\beta l<0$ to $\beta l>0$ as a dose of said X-rays irradiated to each point on said photographic film increases, and iv) carrying out an operation represented by a formula $$D' = Db1 - \sum_{k=1}^{n} \beta k(Db2 - Dus.k)$$

where Db1 and Db2 each denote said original image density or an image density obtained by carrying out intermediate processing of a signal representing said original image density, and D' denotes an image density obtained by the operation processing, by use of said coefficient $\beta l$, whereby there is performed an attenuating of spatial frequency components above the spatial frequency component which the unsharp mask density Dus.l corresponding to said coefficient $\beta l$ has in a region of a low X-ray dose inside of single said X-ray image, and emphasizing the spatial frequency components above the spatial frequency component which the unsharp mask density Dus.l corresponding to said coefficient $\beta l$ has in a region of a high X-ray dose inside of single said X-ray image.

35. An X-ray image processing apparatus for processing a signal representing an original image density, which has been read out at each scanning point on an original photograph obtained by exposure of a photographic film to X-rays, by an operation device, and reproducing said X-ray image as a visible image on a copy photograph or the like by use of the signal representing the processed image density, wherein the improvement comprises constituting said operation device for:

i) obtaining an unsharp mask by averaging original image densities within a predetermined range surrounding each scanning point, and denoting a density of said unsharp mask by Dus, ii) denoting a coefficient corresponding to said unsharp mask by $\beta$, iii) adjusting said coefficient $\beta$ to be a function shifting from $\beta<0$ to $\beta>0$ as a dose of said X rays irradiated to each point on said coefficient $\beta$ to be a function shifting from $\beta<0$ to $\beta>0$ as a dose of said X-rays irradiated to each point on said photographic film increases, and iv) carrying out an operation represented by a formula $$D' = Dorg + \beta(Dorg - Dus)$$

where Dorg denotes said original image density, and D' denotes an image density obtained by the operation processing, by use of said coefficient $\beta$.

36. An X-ray image processing apparatus for processing a signal representing an original image density, which has been read out at each scanning point on an original photograph obtained by exposure of a photographic film to X-rays, by an operation device, and reproducing said X-ray image as a visible image on a copy photograph or the like by use of the signal representing the processed image density, wherein said operation device comprises:

i) means for obtaining a single unsharp mask by averaging original image densities within a predetermined range surrounding each scanning point or averaging image densities obtained by carrying out intermediate processing of signals representing the original image densities, or obtaining a plurality of unsharp masks by changing said predetermined range, and denoting densities of said unsharp masks by Dus.k, where k=1, 2, ..., n, wherein n denotes an integer representing the number of said unsharp masks, ii) means for denoting a single coefficient corresponding to single said unsharp mask or denoting a plurality of coefficients corresponding to a plurality of said unsharp masks by $\beta k$ where k=1, 2, ..., n, iii) means for adjusting at least a single coefficient $\beta l$, where l denotes an integer within the range of 1 to n, among step ii's said single coefficient or coefficients $\beta k$, where k=1, 2, ..., n, to be a function shifting from $\beta l<0$ to $\beta l>0$ as a dose of said X-rays irradiated to each point on said photographic film increases, and iv) means for carrying out an operation represented by a formula $$D' = Db1 + \sum_{k=1}^{n} \beta k(Db2 - Dus \cdot k)$$

where Db1 and Db2 each denote said original image density or an image density obtained by carrying out intermediate processing of a signal representing said original image density, and D' denotes an image density obtained by the operation processing, by use of said coefficient $\beta l$.

* * * * *